US012239064B2

(12) United States Patent
Kalinowski

(10) Patent No.: US 12,239,064 B2
(45) Date of Patent: Mar. 4, 2025

(54) PANEL-MODULAR LAYERED WALL SYSTEM FOR SHAPING SPATIAL STRUCTURES

(71) Applicant: Adam Kalinowski, Poznan (PL)

(72) Inventor: Adam Kalinowski, Poznan (PL)

(73) Assignee: FUNDACJA ARTYSTYCZNA IM. TADEUSZA KALINOWSKIEGO, Poznan (PL)

( * ) Notice: Subject to any disclaimer, the term of this patent is extended or adjusted under 35 U.S.C. 154(b) by 350 days.

(21) Appl. No.: 17/600,576

(22) PCT Filed: Mar. 31, 2020

(86) PCT No.: PCT/PL2020/000036
§ 371 (c)(1),
(2) Date: Sep. 30, 2021

(87) PCT Pub. No.: WO2020/204737
PCT Pub. Date: Oct. 8, 2020

(65) Prior Publication Data
US 2022/0174886 A1 Jun. 9, 2022

(30) Foreign Application Priority Data
Apr. 2, 2019 (PL) ........................... P.429496

(51) Int. Cl.
*A01G 9/02* (2018.01)
*E04B 1/32* (2006.01)
(Continued)

(52) U.S. Cl.
CPC ............... *A01G 9/025* (2013.01); *E04B 1/32* (2013.01); *E04C 1/395* (2013.01); *E04C 2/526* (2013.01)

(58) Field of Classification Search
CPC ......... A01G 9/025; A01G 9/022; A01G 9/023
(Continued)

(56) References Cited

U.S. PATENT DOCUMENTS 4,499,688 A * 2/1985 Droll ................. A47G 7/044
47/67
4,621,467 A * 11/1986 Golden ............ E04B 1/3211
D25/13
(Continued)

FOREIGN PATENT DOCUMENTS

AU 534395 B2 1/1984
EP 2856859 B1 7/2016
(Continued)

*Primary Examiner* — Tien Q Dinh
*Assistant Examiner* — Kevin M Dennis
(74) *Attorney, Agent, or Firm* — D'Ambrosio & Menon, PLLC; Usha Menon

(57) ABSTRACT

The panel-modular layered wall system for shaping spatial structures is characterised by the fact that: the arrangement of horizontal layers configured by means of joined sideways panels of various shapes, filled with the substrate, whose surfaces are planted with plants according to the principle of bipolarity, preferably using transparent or opaque panels, which are mounted on cantilevers with a variable supporting angle, always forms the horizontal arrangement of panels, placed a maximum of three (when with plants and more when without) on the flat or bent frame of the module in the shape of a rhombus, a rectangle and a trapezium made of a closed profile with a rectangular cross-section, where the frames of modules joined together along the perimeter by means of couplers form the vertical load-bearing frame, sloping load-bearing frame, arched-barrel load-bearing frame, spherical load-bearing frame, cylindrical load-bearing frame and sloping cylindrical load-bearing frame, which, together with the use of silos filled with the substrate, joining individual panels and layers, forms self-supporting layered (Continued)

Figure 1:
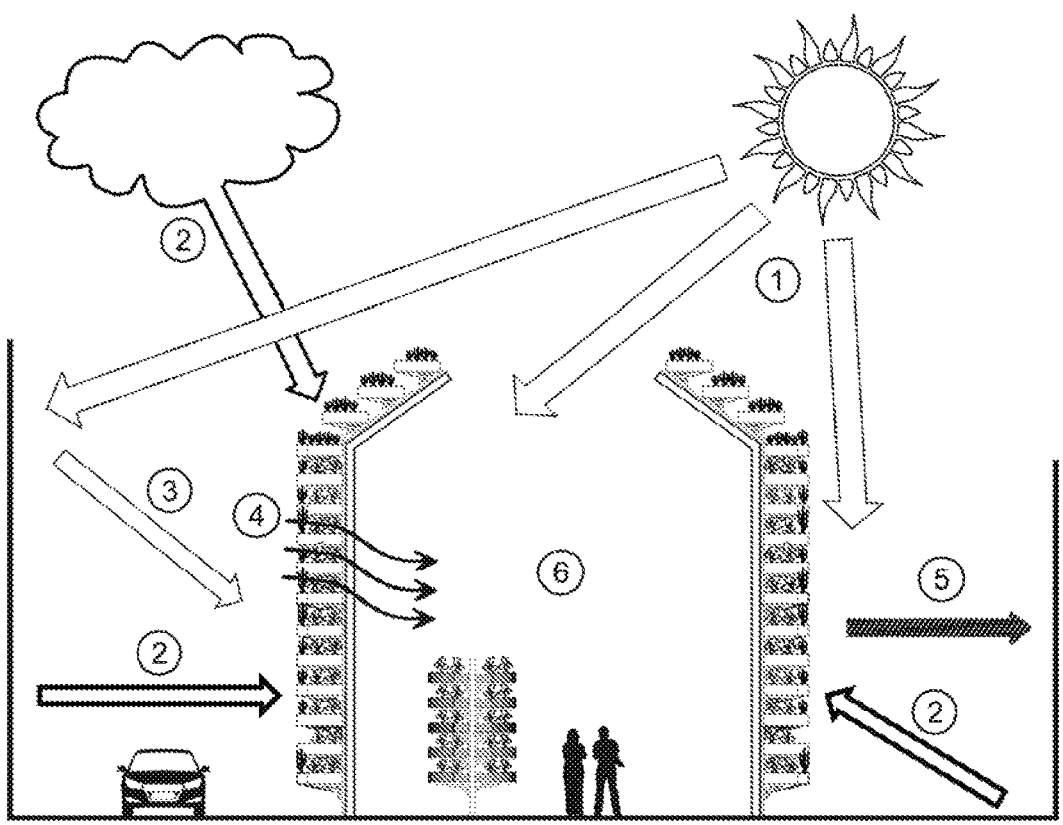

wall structures in six variants, which can be configured with each other.

4 Claims, 22 Drawing Sheets

(51) Int. Cl.
 *E04C 1/39* (2006.01)
 *E04C 2/52* (2006.01)
(58) Field of Classification Search
 USPC .................................. 47/83, 82, 86
 See application file for complete search history.

(56) References Cited

U.S. PATENT DOCUMENTS

| | | | | |
|---|---|---|---|---|
| 4,658,541 | A * | 4/1987 | Haile | A01G 9/022 52/592.6 |
| 5,570,540 | A * | 11/1996 | Womack | A47G 7/041 47/60 |
| 5,741,339 | A * | 4/1998 | DuMars | A01G 9/025 52/611 |
| 6,725,601 | B2 * | 4/2004 | Chick | E01F 8/027 52/745.09 |
| 7,627,983 | B1 * | 12/2009 | Deutsch-Aboulmahassine | A01G 9/025 47/65.5 |
| 7,818,919 | B1 * | 10/2010 | Maxwell-Merrill | A01G 9/025 47/83 |
| 8,250,804 | B2 * | 8/2012 | Chang | A01G 9/025 47/65.9 |
| 8,464,476 | B2 * | 6/2013 | Roberts | E04B 1/3211 446/124 |
| D689,302 | S * | 9/2013 | MacKenzie | D6/558 |
| 8,607,527 | B2 * | 12/2013 | Chang | E04C 1/395 47/65.9 |
| 8,776,433 | B2 * | 7/2014 | Huang | A01G 31/06 47/82 |
| 9,210,846 | B2 * | 12/2015 | VanLente | A01G 31/02 |
| 11,252,875 | B1 * | 2/2022 | Taylor | A01G 9/047 |
| 2008/0066393 | A1 * | 3/2008 | Sorensen | E04B 1/3211 52/81.1 |
| 2008/0236036 | A1 * | 10/2008 | Feuz | A01G 9/025 47/39 |
| 2011/0113685 | A1 * | 5/2011 | Chang | A01G 9/025 47/39 |

FOREIGN PATENT DOCUMENTS

| | | | | |
|---|---|---|---|---|
| JP | H07322763 A | * | 5/1994 | |
| JP | 2007274948 A | * | 10/2007 | |
| KR | 101822591 B1 | * | 9/2015 | |
| WO | WO-2010009505 A1 | * | 1/2010 | ............ A01G 9/025 |
| WO | 2017203543 A1 | | 11/2017 | |

* cited by examiner

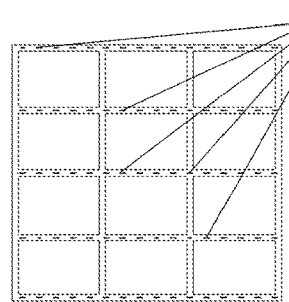
Fig.6
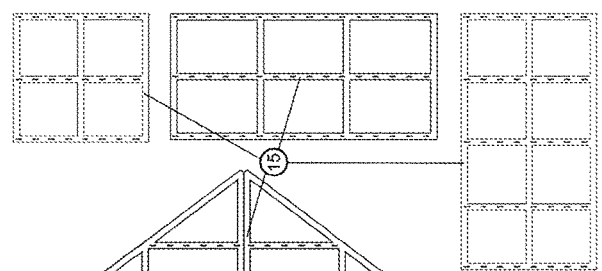
Fig.7
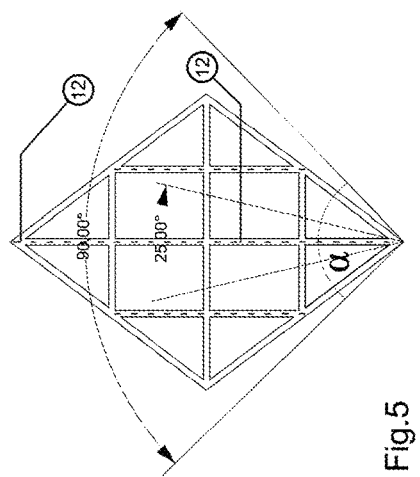
Fig.5
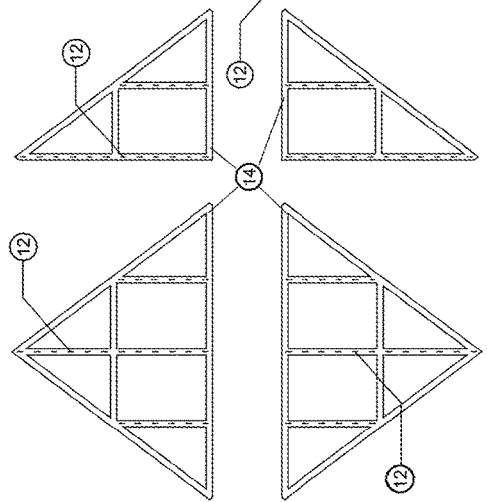
Fig.4
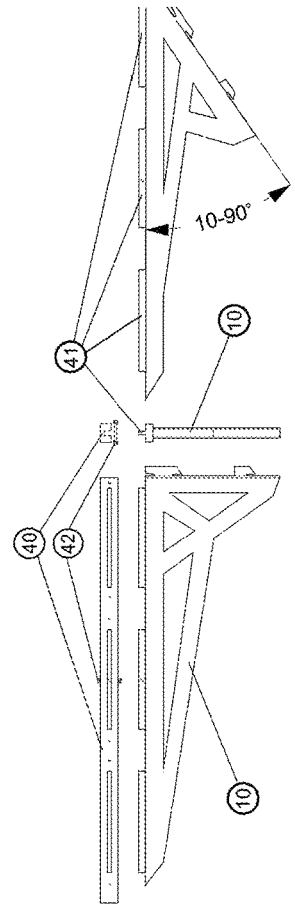
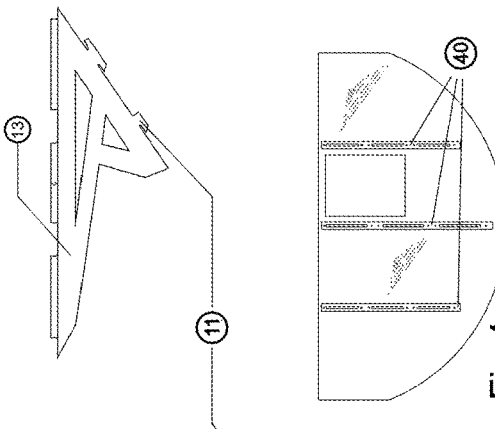
Fig.3

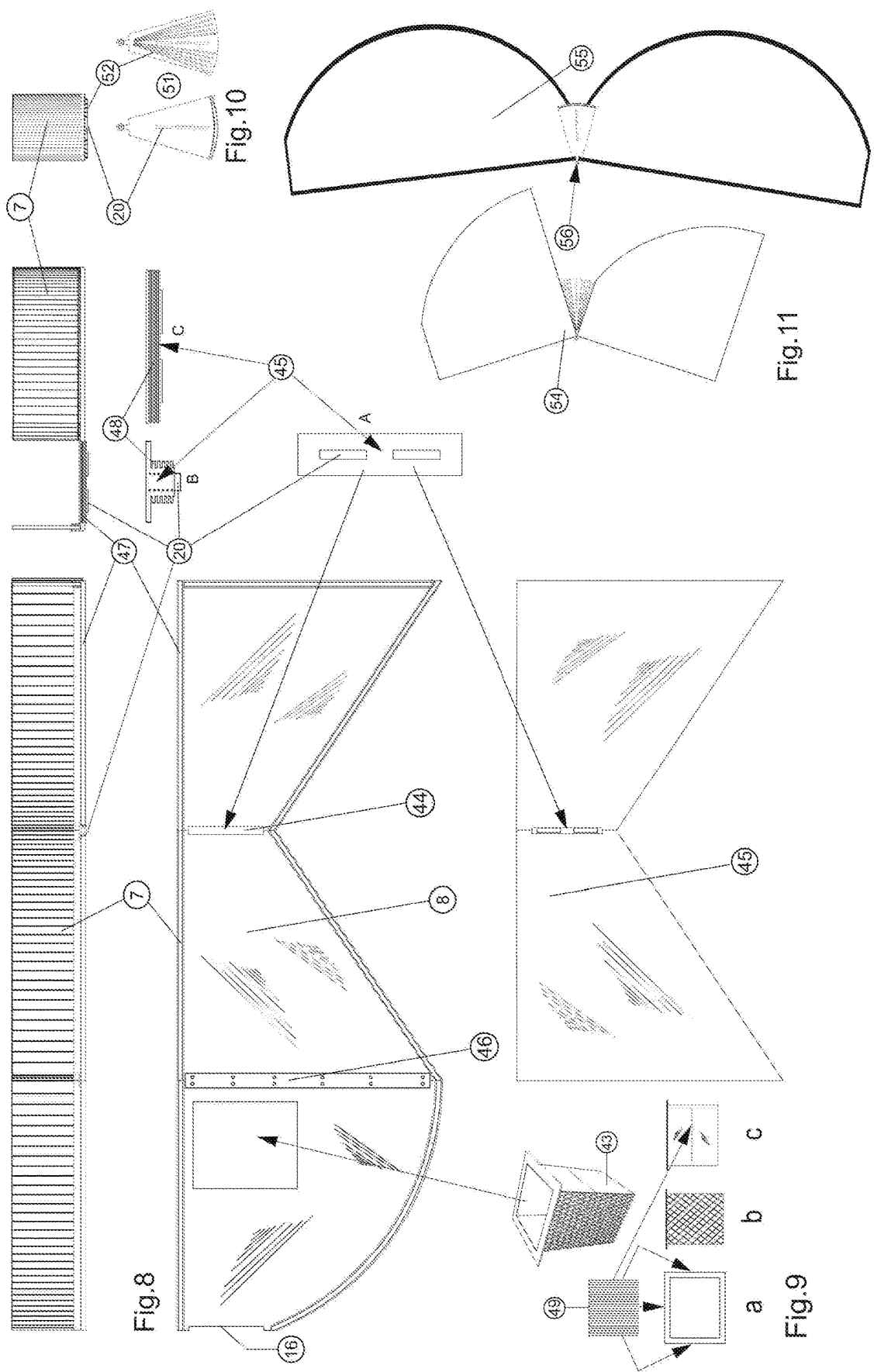

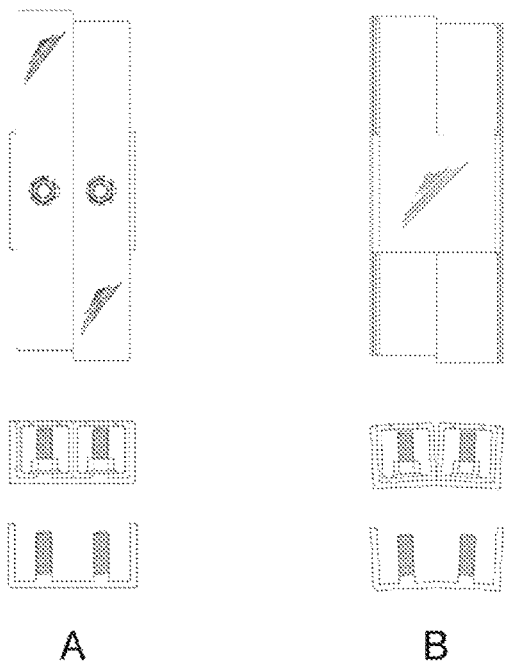
A　　B
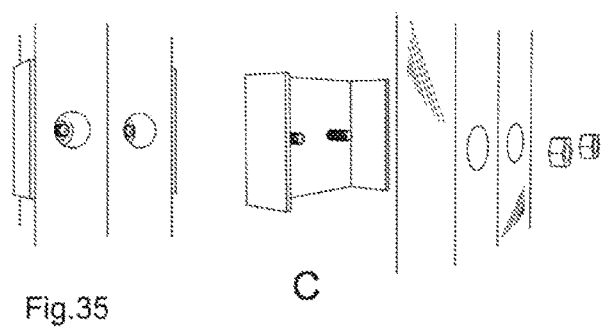
Fig.35　　C
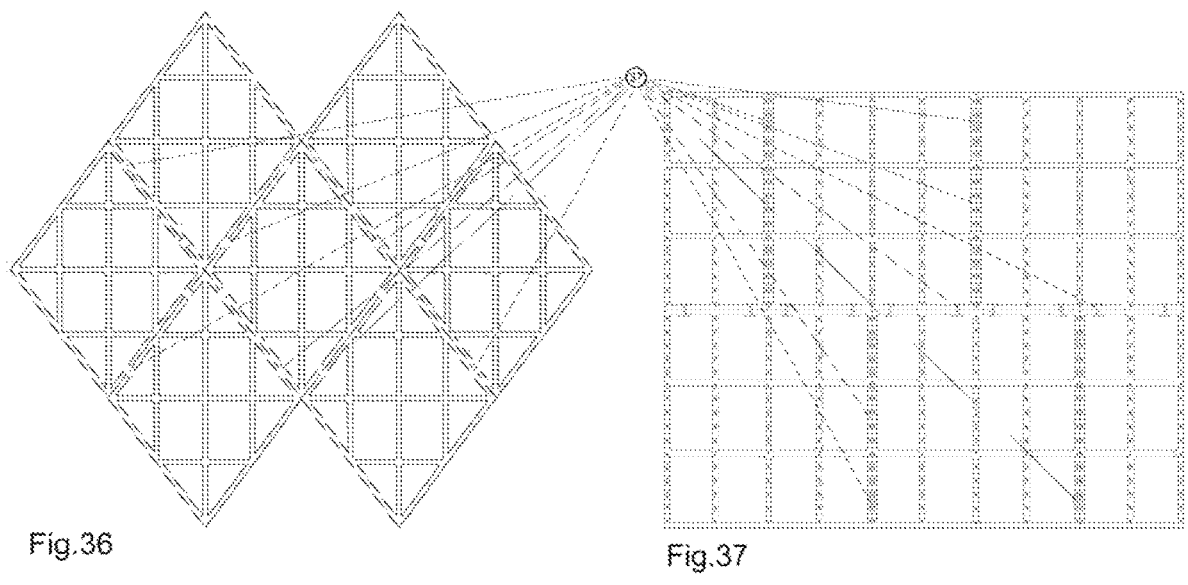
Fig.36　　Fig.37

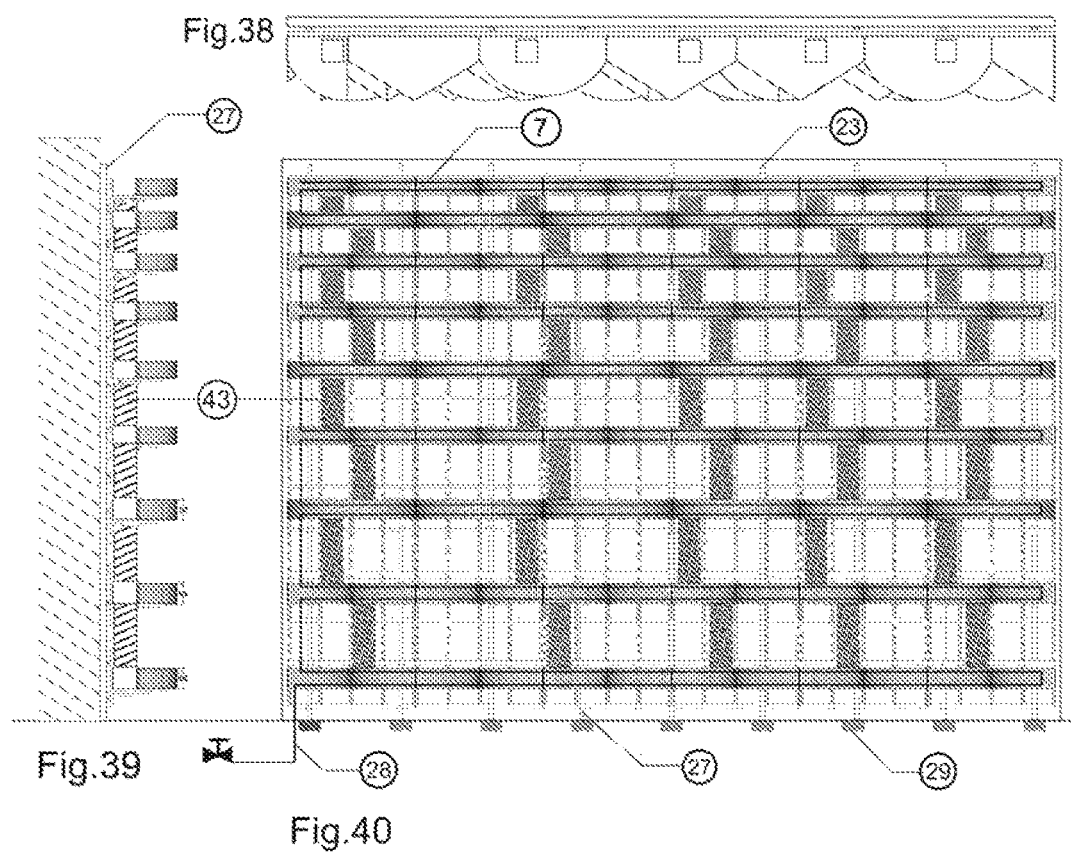
Fig.38
Fig.39
Fig.40
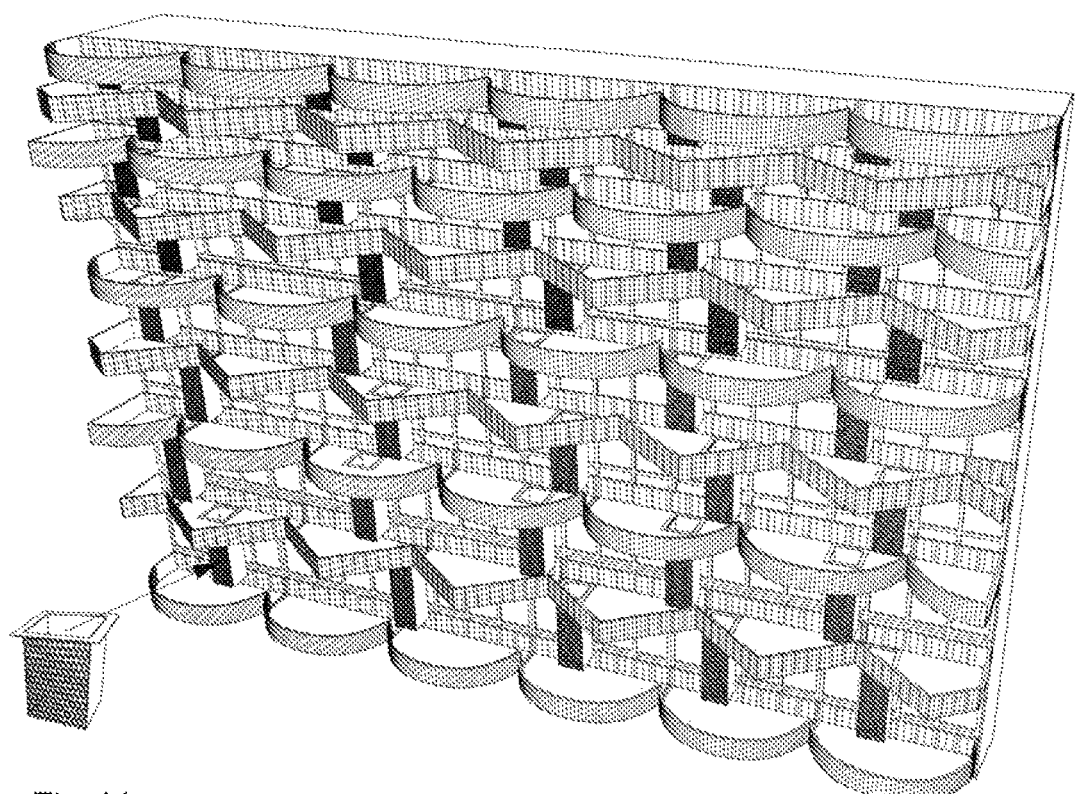
Fig.41

Fig.42
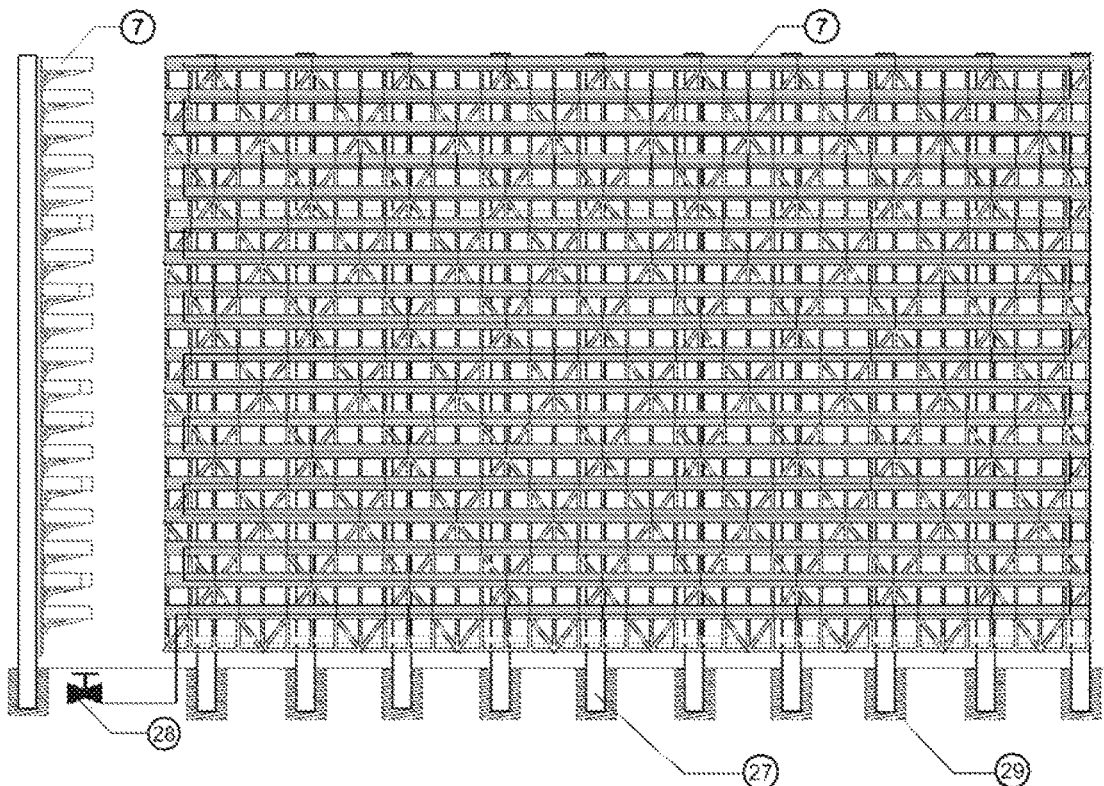
Fig.43   Fig.44
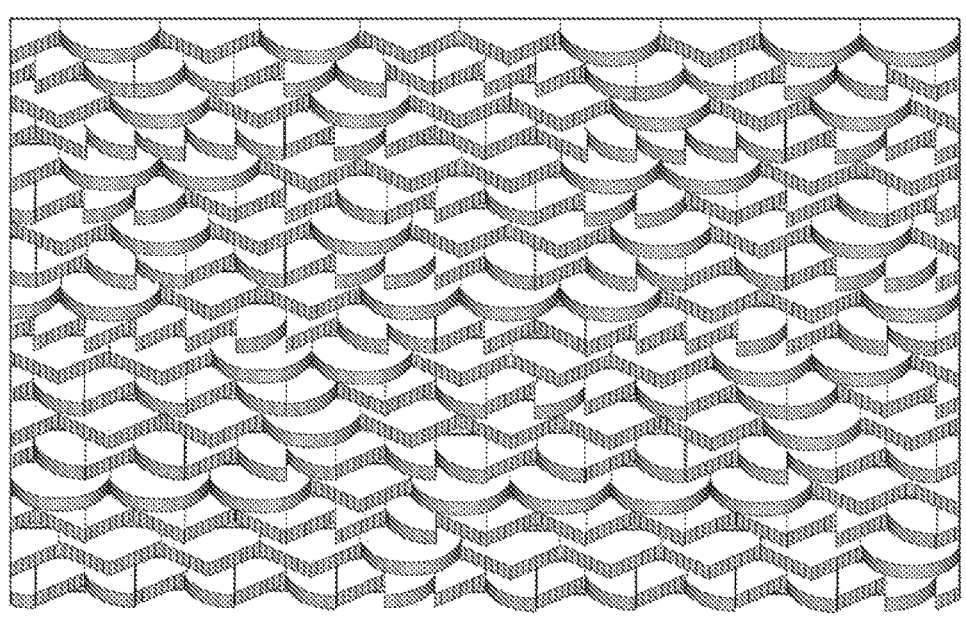
Fig.45

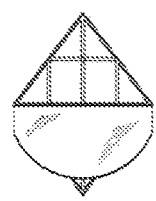
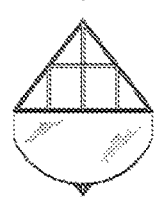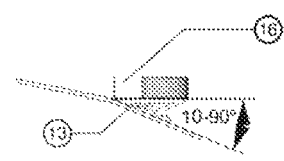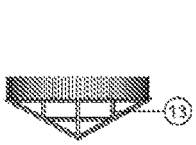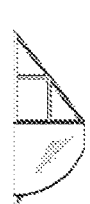
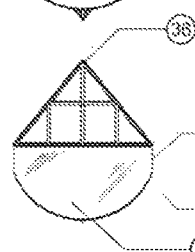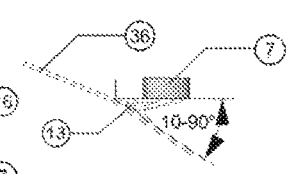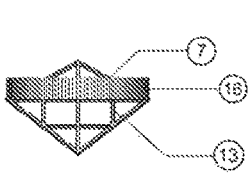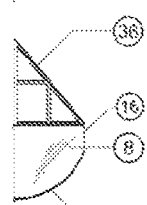
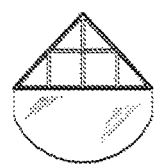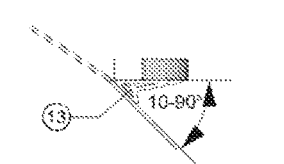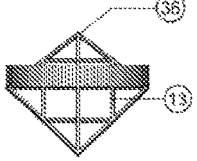
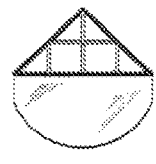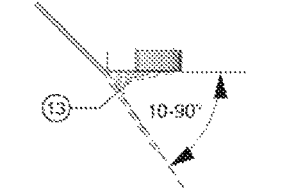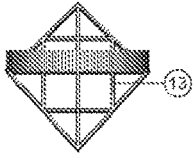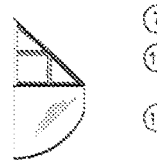
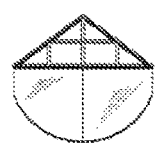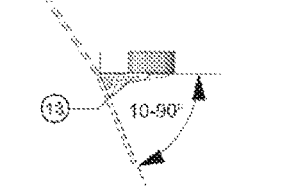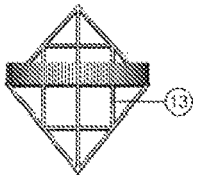
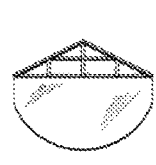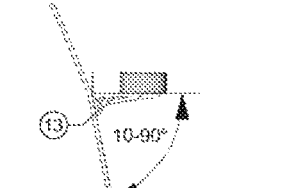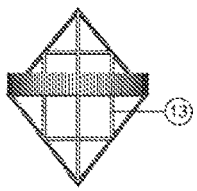
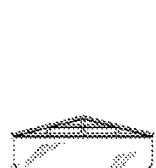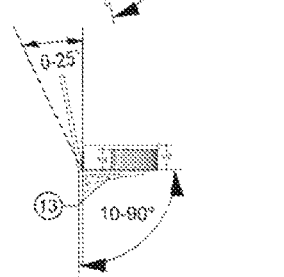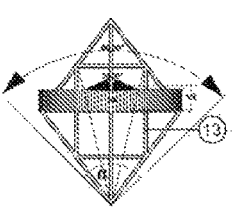
Fig.58    Fig.59    Fig.60    Fig.61    Fig.62

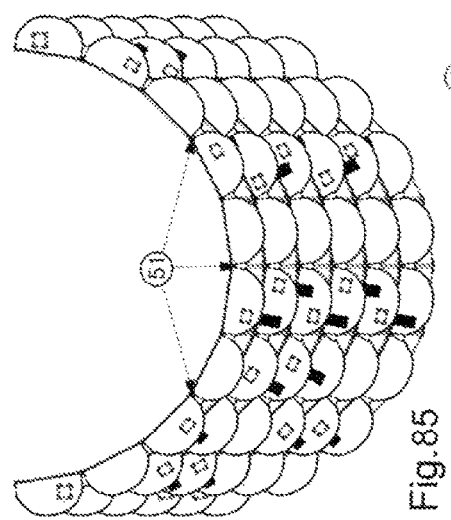
Fig. 85
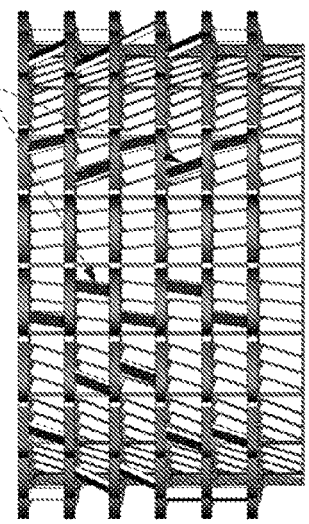
Fig. 86
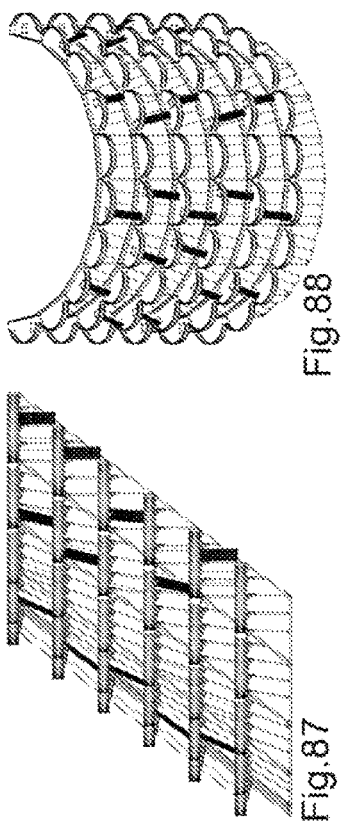
Fig. 88
Fig. 87
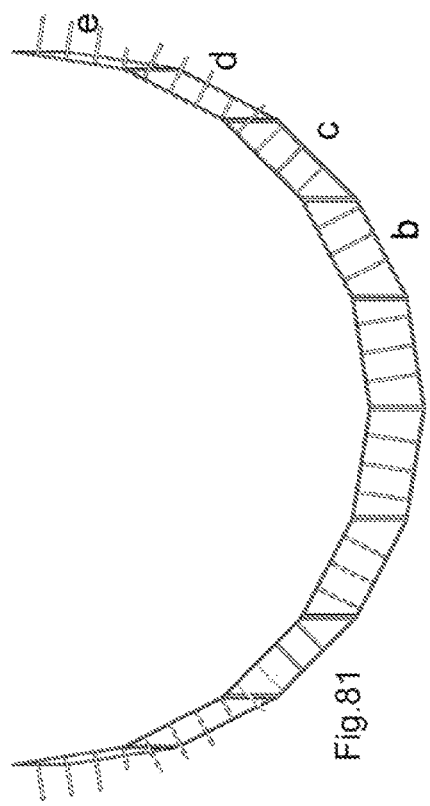
Fig. 81
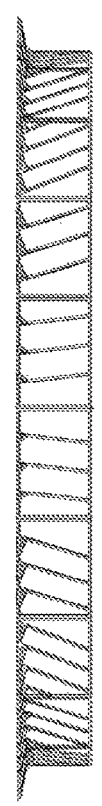
Fig. 82
Fig. 83
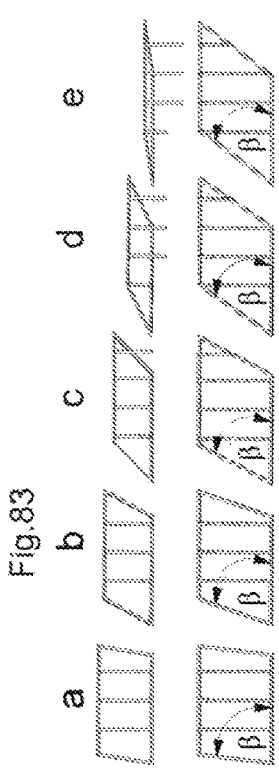
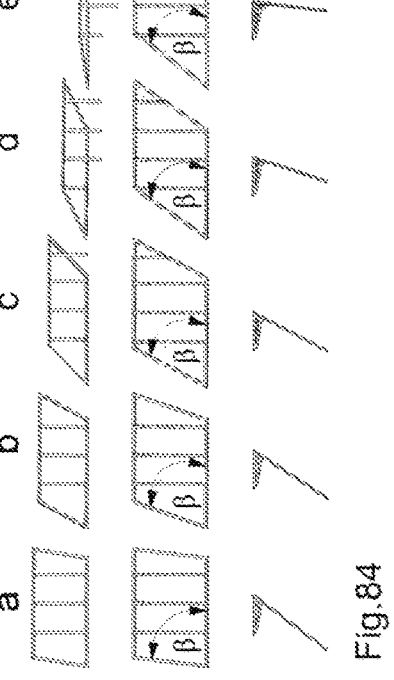
Fig. 84

PANEL-MODULAR LAYERED WALL SYSTEM FOR SHAPING SPATIAL STRUCTURES

The subject of the invention is a panel-modular system for shaping spatial structures which, as a technical solution, is a combination of the load-bearing construction and vegetation, providing climatic comfort for users, characterized by oxygenated, fine dust free, cooled and moist air, and enabling plant production in difficult spatial and climatic conditions. The panel-modular system is a new solution that can be installed in the form of independent and self-supporting structures in space or it can be an element of existing or planned building structures.

The presented panel-modular solution of the layered wall, used to construct green structures in urban space, can be generally referred to the concept of so-called street furniture, especially in the field of landscape architecture where one of the objectives of the solution may be acquiring the parameters defining climate comfort.

The concept of climate comfort is commonly used in the landscape design industry as an umbrella term for determining the parameters of temperature, moisture, air pollution and light. The notion of climate comfort is related to such factors as: temperature reduction, oxygenation, moistening and air purification from gaseous pollutants and dust.

The panel-modular solution applied on the wall surface e.g. of a building or as a free-standing structure can be referred to three basic technologies used in the practice of so-called Green Wall:

A) Container (line) system. In this solution, climbers are used which are planted in containers placed on the particular floors of the building. Climbers climb on steel ropes or trellises usually attached to the top of the building. This is an uncomplicated technology, as there are no additional improvements in the form of irrigation or fertilisation. The green façade created by this solution has mainly a decorative function.

B) Modular system. This method of creating vertical gardens offers greater possibilities as perennials, grasses, annual plants and even small shrubs are used in this method. The plants are planted in containers usually made of plastic, filled with the soil substrate or mineral wool. They are attached to a frame usually made of rust-proof profiles, separated from the elevation by the waterproof insulation layer, e.g. in the form of geomembrane. Fertilization and drainage system is installed between the modules, and sometimes heating networks with temperature sensors are used to protect roots, tubers and rhizomes from freezing. This technology is characterized by a dense coverage of the wall by plants already at the time of its installation, and thus it has a bigger weight. The modular system can also be a self-contained structure forming e.g. partition walls in the garden.

An example of the modular system solution where containers with plants are placed parallel to the ground surface are e.g. documents no. CN, 106677084 in which a green soundproof wall is revealed, which consists of a concrete slab, sound absorbing panels and planting pots, and at least one surface of the side panel of the concrete slab is provided with strip-shaped protrusions, and a groove for installing each sound absorbing panel or each planting pot is created between each two adjacent strips. The sound absorbing panels are attached to the upper edges of the grooves through a binder, and the sound absorbing panels and the concrete slab form a niche that absorbs resonated sound.

In turn, the patent description no. KR 101425187 reveals the construction in which plants are placed in containers at an angle of about 45 degrees to the ground surface. In this system there is an additional installation supplying the plants with water and, optionally, with fertilizer. At the same time, excess water can be transported and stored for a time of shortage. Each water transporting hosepipe is connected to a water flow regulator.

In this type of solution, containers are used where the biologically active surface is small, the containers are rather higher than wider in shape, and standing out at a small distance from the wall surface, or which are completely hidden in it, as revealed in the description no. WO2017058611. Water is pumped into each container or supplied by means of the drip line and the excess water is drained through drains to the ground with the plants in the containers below.

These systems do not involve the use of rainwater. The issue of exposure of containers or wall plane to sunlight is not considered. For example, in descriptions no. CN_205912565 and the abovementioned KR101425187, separate containers with plants are placed at an angle of approximately 45 degrees to the ground, where plants, as they develop, turn upwards to the upright position for better light exposure, and the container has only the function of holding the plant in position, without supporting or modifying the exposure to sunlight.

Sometimes the modules with plants are placed perpendicularly to the ground surface. For example, in patent no. EP2309839, where a modular, box-like structure containing the base with plants is used, which, when placed perpendicularly to the ground, make plants turn upwards at 90 degrees as they grow. These systems do not involve the efficient use of rainwater.

It should be noted that the well-known green wall systems and solutions indicated above assume the use of separate containers of a homogeneous, repeatable shape, with a small surface area in the form of buckets, oblong tubs or regular polygons containing the base on which plants grow and where water is supplied and which are placed at a short distance from the elevation of the building in the even, vertical plane on the frame of the structure, mounted to the wall or integrated into the wall.

A different way of growing plants is the concept of the so-called Patrick Blanc's green wall which combines the advantages of both abovementioned methods and uses the method of hydroponic cultivation of plants. The wall according to this doctrine consists of pockets of two layers of artificial felt which are the basis for the development of the root system. In one of the layers, regular holes are made in which the plants are planted. The solution is characterized by the low weight of the structure, the use of many types of plants, and low installation costs. The appropriate choice of material ensures steady water distribution throughout the system. The irrigation system consists of drip lines placed on top of the structure. The irrigation intensity depends on the season of the year, the weather conditions and the requirements of the plants used.

Known from the patent literature and practice examples of system solutions in the field of so-called green wall are dedicated to the installation on the wall surface of the building, and the feasibility of using elements of these systems to build a self-contained or self-supporting object in space, especially of a closed or semi-closed form, with a clearly defined climatic function, is not possible with the components of these systems, as they lack the load-bearing structure provided by the present solution which combines the load-bearing structure with optimal conditions for vegetation of plants.

According to the invention the panel-modular layered wall system for shaping spatial structures contains at least two modules, each of which is a combination of a layered, horizontal arrangement of panels, preferably placed no more than three on the frame of a shape chosen from a rhombus, a rectangle or a trapezium, made of a closed profile with a rectangular cross-section, together with vegetative plants placed on them on the substrate layer. At the same time, the frames of the modules are connected in such a way that they form a flat vertical load-bearing frame, or a flat sloping load-bearing frame, or a spatial arched-barrel load-bearing frame, or a spatial spherical load-bearing frame, or a spatial cylindrical load-bearing frame or spatial sloping cylindrical load-bearing frame or a combination of such spatial arrangements. In this way joined frames with the panels together with vertical silos filled with the substrate, joining particular panels and horizontal layers, form layered "green" wall structures with the horizontal arrangement of layers in six variants as self-supporting structures. At the same time, the individual panels filled with the substrate and plants are combined into horizontal layers and are joined by vertical silos filled with the substrate.

Depending on an example of an execution, apart from the panels containing the substrate with plants, another panels can be equipped with a transparent filling or can be covered with a mesh with a different weave density, or can be made as 100% opaque panels, e.g. photovoltaic panels within a given structure. The system consists mostly of elements with fixed parameters as well as several variable ones, used in 6 variants of the solution.

The panels are selected in such a way that the elements of the system consist of 2 whole panels, 4 half ones and preferably 8 complementary ones for the possible use on a rhombus frame. In addition, the system consists of—cooperating with panels—panel joining strips, panel docking strips, cantilevers with a fixed deflection angle or variable deflection angle within the structure in the range of 10 to 90 degrees, the lock of panel cantilevers, two types of module frames: flat and bent in the central part in the range of 0 to 25 degrees in the shape of a rhombus and a rectangle and frames resulting from division, frame couplers, silos with an inclination angle from 30 to 90 degrees, as well as preferably panel bands.

The panels which are not bound by bands appear exclusively as devoid of plants, with a full or transparent filling, thus that they can be mounted on the module frame in a different, closer sequence of distances between the planes of the panels.

In addition, as a separate arrangement, according to the invention the system comprises the irrigation system for plants; the substrate for plants and the method of planting them are selected within the structure according to the bipolar key.

Only the sloping cylindrical load-bearing structure consists of 5 frames of modules with a variable angle Alpha within one structure with a predefined inclination angle of the structure. The flat load-bearing plane on which the panels of the system are mounted, according to the invention, is made up of flat frames of modules in the shape of a rhombus or halves and quarters of a rhombus, which are joined together sideways, or in the shape of a rectangle and frames constituting halves of its shape, which are joined together sideways by means of couplers, and on them panels are mounted, filled with the substrate with plants which another adjacent layers are joined by vertical silos and/or with panels with a transparent or 100% opaque filling. In this case a combination into the layers is done by means of cantilevers with a 90 degree supporting angle. At the same time, the load-bearing plane as a whole is assembled vertically to the ground and forms the vertical structure of the layered wall.

In another example of an execution, combining into layers is done by means of cantilevers with a supporting angle of 15-90 degrees, then the load-bearing plane, as a whole, is assembled diagonally to the ground and forms the sloping structure of the layered wall.

In the case when the construction of the structure is made with the use of module frames in the shape of a rhombus and a half rhombus with couplers with angles in the range of 25 to 90 degrees or in the shape of a rectangle and a square, bent symmetrically in the middle part at an angle in the range of 0 to 25 degrees, they are joined sideways diagonally or with a shift by means of couplers and together they form the arched-barrel load-bearing frame of the layered wall on which the panels filled with the substrate with plants are mounted, joined by vertical silos, and/or panels with a transparent or 100% opaque filling, combined into layers directed perpendicularly to the arch of the structure and horizontally to the ground supported by cantilevers with a supporting angle in the range of 10 to 90 degrees, which form the arched-barrel structure of the layered wall.

When module frames in the shape of a trapezium or a rhombus, bent symmetrically in the central part at an angle in the range of 0 to 25 degrees, are joined together sideways by means of couplers, creating together the self-supporting spatial spherical structure of the layered wall, on which panels filled with the substrate with plants are mounted, these panels are joined by vertical silos, and/or panels with a transparent or 100% opaque filling, which are combined together into layers directed perpendicularly to the arch of the structure and horizontally to the ground supported by cantilevers with a supporting angle in the range of 10 to 90 degrees, then these module frames together form the spherical structure of the layered wall.

In another example of an execution, the cylindrical spatial load-bearing plane formed from flat or vertically bent module frames in the shape of a rhombus or halves and quarters of a rhombus, which are joined together sideways diagonally or in the shape of a rectangle, and frames constituting half of its shape, which are joined sideways by means of couplers and on it panels are mounted, filled with the substrate with plants, joined by vertical silos, and/or with panels with a transparent or 100% opaque filling, combined into layers by means of cantilevers with a supporting angle of 90 degrees, which, as a whole, are vertically mounted to the ground, form the cylindrical structure of the layered wall.

In another example of an execution, the cylindrical sloping spatial load-bearing plane made out of flat module frames in the shape of a rectangle and a trapezium which are joined sideways by means of couplers, on whose spatial plane panels filled with the substrate with plants are mounted, joined by vertical silos, and/or with panels with a transparent or 100% opaque filling, joined in layers, using cantilevers with a supporting angle in the range of 10 to 90 degrees, which, as a whole, are mounted diagonally to the ground and form the cylindrical sloping structure of the layered wall.

At the same time, within the structures of the front of the panels, starting from the layer of panels placed closest to the ground up to the top one, the panels are in one plane, while the surfaces of horizontal cross-sections of the panels do not coincide with each other in a top view, but pass each other. This is a feature that distinguishes this solution from existing panel modular solutions in the field of Green Wall.

The distances between the surface of the planes of the panels/layers, depending on the example of an execution, are either fixed or different for the layers of vertical, sloping, arched-barrel, spherical, cylindrical and sloping cylindrical structure. This is the second major structural difference between the present solution and the cited patent solutions.

In the example of an execution in which the modules are built in the sloping and sloping cylindrical structure, the panels filled with the substrate with plants are preferably placed up to two pieces, one above the other on the rhombus or rectangular frame, in the range of 15 to 70 degrees of inclination of the sloping structure to the ground surface, while in another favourable example of an execution, with an inclination angle of the frame from 70 to 90 degrees, the panels filled with the substrate with plants can be placed up to three pieces, one above the other on three levels on the module frame.

Within the sloping structure, a supporting angle of the cantilevers is fixed depending on an adopted inclination angle of the structure in the range of 15 to 90 degrees.

Within the sloping structure, the fronts of the panels, starting from the panel layer placed closest to the ground level up to the top one, are in one plane regardless whether the distances between the surfaces of the panel layers are regular or variable. The distances between the surface of the planes of panels/layers can be fixed or variable for sloping structure layers, depending on the example of an execution.

In the case of using the module frame with a fixed deflection angle within a given arched layered wall structure, going from the bottom to the top part of the arch of the construction towards the inside part of the arch, the distances between the layers made up of panels mounted on frames gradually decrease.

Where the module frames used to build the arched structure have different deflection angles in the range of 0 to 25 degrees within a single structure of this type, the arch curvature of the structure is either steep or flattened, depending on the way the module frames with a variable angle are mounted, which affects the distances between the planes of the panels/layers and their fronts. As the distances between the fronts of the panels, starting from the lowest layer at ground level and moving upwards in the internal direction of the arch of the construction, gradually increase to achieve the greatest distance between the front of the penultimate panel and the last one at the top of the arch of the arched construction, natural clearances are created by which light penetrates into the structure and illuminates it.

In the lower part of the arch of the construction, there are then up to three panels filled with the substrate with plants, mounted one above the other on the module frames, while higher, in the direction of curving of the arch of the construction, the number of panels is reduced to two and at the top there is one panel on the module frame.

In the case of employing the layers with the use of transparent panels, with colourless or coloured fillings, or using a mesh with different weave density, or only whole, 100% opaque panels, which are lower compared to panels with the substrate with plants, the panels are closely adjacent, without space between the panels for the growth of plants. The panels are then placed in any sequence on the structure the way the mounting holes for the cantilevers supporting panels enable it.

In another example of an execution, on the bent frame in the shape of a rhombus, a rectangle or a trapezium in the range of 0 to 25 degrees, on which (of which) the load-bearing plane of arched or spherical construction is built, but also on the vertical and sloping construction of the layered wall, only transparent panels are used, with a colourless or coloured filling or with a mesh of different weave density, or only whole, 100% opaque panels in layers one above the other, joined by cantilevers with a supporting angle from 10 to 90 degrees. In the case of the load-bearing construction of the arched layered wall, this construction is made in such a way that the module frames in the shape of a rhombus or a half rhombus in the vertical and horizontal position or in the shape of a rectangle/square and a half of the frames of these shapes, bent symmetrically in the middle part in the range of 0 to 25 degrees, are joined sideways diagonally or with a shift and together form the arched structure which can be used in the building industry while maintaining fast assembly with couplers in the form of clamps. Such a construction in another example of an execution is covered with a transparent patch or a 100% opaque one—with a roof.

At the same time, the joining gap between whole, half or complementary panels is filled with a joining strip equipped with expansion joints located on both sides of the strip and is placed by pressing between the edges of the panels.

In the example of an execution in which the load-bearing construction has the shape of a sphere, the layers of the panels are supported on cantilevers and are joined in the corners by means of a joining bolt. The panels resting on the cantilevers are additionally secured with the joining bolt which joins the cantilever to the docking strip mounted on the underside of the panels. The gaps between the joined panels in the corners are reduced in the direction from the layer at the top of the sphere to the bottom, where the diameter of the sphere is longest. The gaps are filled with the joining strip in the shape of a triangle.

The set of frames used in the sloping cylindrical structure has a variable angle Beta for the structure with a given inclination angle, at the necessary minimum of 5 module frames per a quarter of a circle or an ellipse which is the base of the cylinder.

In the case of the sloping frame structure, the module frames are connected one to another diagonally, with the whole side of the frame of a rhombus, a rectangle or a trapezium, preferably with a horizontal/vertical shift, they are additionally filled with a trellis for stiffening and form a regular load-bearing frame of the layered wall structure. In this way, the whole panels are adjacent to the whole ones and the half panels to the half ones, which is an optimal solution as it allows for a variety of shaping of the whole modules and thus of the panel layers. It would be possible to adopt a different rule of joining the sides of rhombus frames only up to a half of their length, but by joining them in this way, large panels would join with small ones, which would limit the number of combinations of their joining, apart from that, if the need be, additional supplementary modules would have to be created in order to level the wall edge of the structure. Frames in the shape of a rhombus or a rectangle/square are screwed together wholly sideways, one to another, creating a uniform plane.

Depending on the scale or design needs, one type of frames of both shapes can be used in the layered wall structure or only one frame shape can be used in the configuration of the solution variants. In order to obtain greater rigidity of the vertical load-bearing frame with the use of square module frames, the frames may be joined in such a way that they are shifted in the adjacent layer by half horizontally or vertically analogously to the arrangement of brick layers in traditional building construction (staggering brick).

On the elements of vertical trellises of the frames in the shape of a rhombus and a rectangle and the frames in shapes resulting from their division by ½, ¼, ⅛, there are mounting holes for cantilevers at regular distances from the top to the bottom of the frame which correspond to the spacing of mounting hooks for the cantilevers supporting panels in 4 types of the layered wall structures, thus the distances between the created planes of panel layers can be freely adjusted within these structures. The set of frames used in the cylindrical sloping structure has a variable angle Beta for the structure with a given inclination angle at the necessary minimum of 5 frames per a quarter of a circle or an ellipse being the base of the cylinder. The frames of the modules are joined by means of couplers, in particular made of thick, profiled sheet metal, bent into a "u" shape with two welded threaded pins located in the inner part of the clamp. The holes, in which are inserted the threaded pins of the clamp joining both frames, are placed on the perimeter of the whole frame at regular intervals. On the opposite side of the hole into which the pin enters, there is a mounting hole, larger to accommodate a socket wrench for the self-locking nut which is screwed onto the pin. The mounting hole is located on the outside of the structure where the cantilevers and panels on the frames are mounted. The frames forming spherical or cylindrical structures (vertical and sloping) are joined by means of couplers bent in the middle at angles in the range of 0 to 25 degrees according to the applied deflection of the frames of trapeziums or rhombuses.

According to the invention, the modules (layers) of the system, when regular distances between the planes of panels/layers within the structure are assumed, are differentiated by a configuration of six basic panels of four types of shape, two whole ones in the shape of an isosceles triangle and a semicircle, placed in the middle of a rhomboidal, square or trapezoidal horizontal frame and four half ones, two in the shape of a triangle in the left and right arrangement (this is one triangular shape rotated left and right, resulting from the division of the whole triangular panel) and a quarter of a circle being a half of a semi-circular panel (the shape of a quarter of a circle rotated left and right) placed symmetrically in a horizontal position at the same distance above and below the central panel. The ratio of the width of the whole panel to the half panel is 2:1, while the ratio of the complementary panels is 4:1. The depth of all panels except 4 (out of a total of 8) complementary panels is the same. The width of the whole panel is identical to the width of the frame of a rhombus and a square.

Out of six basic panels of two sizes used, a total of 32 variants of the basic module on the frame in the shape of a rhombus can be configured, not counting the halves and quarters of the panels used to enclose supplementary modules for possible levelling the edges or corners of the layered wall structure. On the square frame, on the other hand, there are as many as 320 possible configurations while using only 6 panels.

The half panels in the shape of a quarter of a circle or halves of panel in the shape of a isosceles triangle can be, in the favourable example of an execution, combined into the whole panel of irregular shapes by means of a mounting batten that rigidly joins both panels.

Each panel consists of the base and bands, keeping the moist substrate with plants inside the panel. The height of the bands is normally ¼ of the panel depth when the panels are mounted on three levels on the module frame and up to ⅓ of the panel depth when using a double or single panel on the module frame. The bottom and bands of the panel are lined with an insulating layer of polystyrene and insulating foil in particular, which are covered with the layer of expanded clay and the substrate with plants. The bands, placed in the guide bar screwed to the edge of the panel, encircle each whole panel around, except for parts of its both sides along the panel width, and "truncated" on the sides at an angle of 90 degrees to the plane of the module frame, by which they butt the adjacent panels on both sides at more than ⅓ of the depth of each panel. In this way, they form a horizontal layer, stretching along the layered wall structure. The half panels are joined sideways on one side at ⅓ of the panel depth and on the other side along the entire panel depth. Each panel, by connecting with the adjacent panels, creates a long level, stretching along the entire layered wall structure.

The joining sides between whole or half panels are filled with a joining strip, which is pressed into place by means of expansion joints, filling a notch for the strip placed between the edges of the panels. The joining strip is equipped with drains that take away excess water onto the layers of panels located below within the structure. This element, together with the possibility of taking out the panel from the cantilevers when the lock is released, enables quick disassembly of the entire panel and its contents. The joining strip with drains can be used together with vertical silos or only if the silos are not used within a given structure or are used to join only some layers of the structure. In the spherical structure and cylindrical structures, the joining strip used to fill the gaps between panels is in the shape of an isosceles triangular with expansion joints placed on the underside, which are removed when redundant, fitting closely to the size of the gap between the joined panels in the corners with a joining pin. The panels are supported by cantilevers of three different sizes, adjusted to the shape and size of the panels, which are mounted in the mounting holes placed on the elements of the vertical trellises of the frames in the shape of a rhombus and a rectangle and the shapes resulting from their division, at regular distances from the top to the bottom of the frame, which correspond to the spacing of mounting cantilevers supporting the panels. Thus, the distances between the created planes of the panel layers can be freely shaped within the 3 types of layered wall structures according to the optimal climatic objective.

Apart from cantilevers with a 90 degree supporting angle, used in vertical structures with open, closed and semi-closed arrangements, the changing element is a supporting angle of the panels by means of cantilevers which must be adjusted to a desired inclination angle of the sloping wall in the range of 15 to 90 degrees or to the assumed curvature of the arch of the arched-barrel or spherical wall. In the latter two, the inclination angle of the cantilever's foot will be variable within the construction of the arch in the range of 10 to 90 degrees, depending on the position of module frames and a given layer of panels in the arch section of the arched-barrel or spherical structure, in order to maintain ever-horizontal position of the panels, regardless of the angle of the position of a given module frame on the arch of the structure in relation to the ground (FIG. 59, elem. 13,36).

Each cantilever inserted into the frame holes is locked by means of the hook tines. Partial or full replacement of the panels at any level of the layered wall structure, while leaving the cantilevers plugged into the structure, will be made possible by docking strips mounted at the bottom of the panels into which the guide bars of the cantilevers enter.

In each of the assumed examples of an execution, the substrate layer is not less than 15 cm thick. Preferably when the substrate layer is 15-35 cm thick.

The silos joining the layers are fully filled on three sides, while their front is covered with a fine weave mesh. The silos have an inclination angle of 30 to 90 degrees as seen in the side view of the structure and can be used in all types of the layered wall construction. The panels with a hole for the silo, together with the silo located there, are placed, at the most, every third, preferably every second whole panel without a hole, within a given layer made of panels. The silos have holes for combs of rods, which are inserted on three sides at fixed distances at the height of the silo.

The irrigation system is installed in all the module panels forming together layers and the panel-modular system. Preferably on each layer there is a separate controller which doses the water quantity due to the requirements of the plants placed there. The irrigation system is connected to a continuous water supply or a refillable tank with a pump, guaranteeing a continuous water supply to the irrigation system. The water supply varies depending on the season of the year, needs and type of plants, e.g. shade-loving plants or photophilic plants (heliophytes), location of the spatial and climatic structure. Rainwater is obtained thanks to the appropriate scale of panel planes and configuration of layers, and through vertical silos it is distributed within the combined system of the layered wall, which in the case of regular rainfall may result in periodic shutdown of the irrigation system.

On the layered wall created with the help of the system according to the invention, plants are placed according to the principle of bipolarity. On the outer and better illuminated parts of the panel, photophilic plants are placed, and on the inner and lower layers of a given structure, shade-loving plants are placed. In all variants of the structures, plants will adapt well, so all of them will be useful for plant production, while the structures: sloping flat, sloping cylindrical, spherical, arched-barrel, including the combination of these structures are particularly useful for the application of photophilic plants on the structure due to the excellent illumination conditions of all layers of these variants of the layered wall structures.

The selection of the set of plants should take into account the following spatial conditions: —the climatic conditions of a given location (the set of plants for the location of the structure in a dry and hot climate will be different from that in a temperate climate). —Location of the structure in relation to geographical directions: —Features of the construction of a given structure, e.g. the light of clearance between the levels, which should be taken into account when selecting plants in terms of height or the location of appropriate plants in different parts of the structure, particularly due to the intensity of natural lighting: —Taking into account the immediate architectural environment. Plants when they grow struggle with the limitations of the structure's dimensions and fill the spaces between layers. Thus, in addition to their function of oxygenation and moistening, they act as a natural filter retaining the moist and cool air inside the closed structure, and also not allowing a certain amount of dust to pass from the outside of the object into the inside, or from one side to the other when the structure is semi-closed or open and separates, for example, a car lane from the pedestrian track or constitutes a green façade of a building behind which the windows of the building may be situated.

Using six variants of the solution, out of the elements of the vertical, sloping, arched, spherical, cylindrical and sloping cylindrical layered wall structure, it is possible to construct the structures with an open, semi-closed and closed arrangement with or without a supporting frame and as a result it is created an autonomous object, completely self-supporting, providing climatic comfort or serving to plant production in difficult spatial and climatic conditions. The solution ensures that climatic comfort is achieved especially inside the closed and semi-closed structure and can have a measurable impact on the climate of the urban environment. Closed structures can be particularly useful for achieving climate comfort in the area with a high level of sunshine, e.g. southern Europe in summer, in a temperate climate, as well as in the region of a hot and dry climate without the use of costly cooling by means of the air-conditioning system, where there is no closed or semi-closed areas in public space in the form of a pavilion or a hall providing such parameters. Lowering the temperature by about 5-7 degrees Celsius and increasing the moistness by about 20-30% is a big microclimatic gain for the structure user, especially in public spaces in cities, used for example in the form of green tunnels for pedestrian transfer. The optimisation of illumination of the joined panels in horizontal and vertical layers by means of silos, the substrate layer sufficiently thick and saturated with minerals and the use of rainwater in addition to continuous irrigation are advantages that enable effective vegetation (plant production) in conditions of urbanised space completely deprived of biologically active surface.

The solution of the layered wall combining two variables: horizontal and vertical is a fusion of their functionalities as it enables its shaping in a vertical and horizontal direction, which fully ensures the realisation of the assumed goals of the solution. In the vertical direction by variably optimal adjustment of spacing between layers in terms of application of appropriate plant matter of different types of vegetation or size. By combining the horizontal layers with the vertical silos filled with the substrate, the system achieves three goals: A). Free transfer of moisture within the entire layered wall structure. Rainwater will complement the irrigation system and it can be assumed that it will be switched off during heavy rainfall because there is a free transfer of moisture from the upper levels that collect the largest amount of rainwater to the lower levels of the structure. B). It enables the transfer of microorganisms within the whole structure. C). Free expansion of the root system. The silos can link all or selected layers of the structure. While in the horizontal direction, the configuration of the layers of the structure is based on the appropriate combination of 6 basic panels of different shapes and sizes and complementary shapes in order to optimize the illumination of the panel surfaces, rainwater harvesting and due to the type of plant matter applied on the panels.

The solution is characterized by a horizontal layered arrangement, which allows for natural plant growth, as opposed to Green Wall solutions, where plants are planted parallel, at an angle of about 45 degrees or perpendicularly to the ground surface in small containers. The combination of the joined panels into layers, placed horizontally with the vertical load-bearing structure, provides facilities for vegetative plants, given the volume of the substrate, and by combining the panels in long series of layers with different edges, placed one above the other, creates good conditions for the vegetation of plants crammed into the confined spaces of the layered structure. The fair-sized ecosystem, which is each level of the layered wall (the panels are joined together at more than ⅓ of their depth), allows plants to vegetate collectively, to increase a mass of the root system, to maintain better moisture and thus better resistance to overdrying and freezing in winter compared to the well-known Green Wall solutions, where without heating the root system in a temperate climate in winter, plants may not survive it. The system of horizontal layers is additionally strengthened by filled with the substrate vertical silos that join these layers. The summer extremes in a dry and hot climate are also a challenge, where the plants are exposed to intense sunlight and overdrying. The thickness of the substrate depends on the distance between the layers, which can vary within a single structure with the use of the system and which can also be scaled up, thus thickness can vary from circa 15 cm to circa 35 cm or more and the substrate is located at the level of the entire layer formed by the panels, thus the rooting layer of the plants is much larger than in the separated containers known in Green Wall solutions. The root system can grow horizontally and also vertically thanks to vertical silos. Structures using this system will be massive, which will allow to obtain the effect of climate comfort with a measurable impact on the surrounding climate, so it can be an effective tool to reduce so-called heat islands in cities. It is possible to differentiate the substrate on each layer, adapting it to plant requirements or regulating the moisture of each layer separately or of several layers joined by vertical silos, so it will be possible to differentiate plant species: succulents, perennials, grasses, ferns, shrubs, selected geophytes, etc. Another advantage is the possibility of using plants of different sizes, thus the plant mass of the layers-ecosystems of structures as a whole will be greater than in the variants of well-known Green Wall solutions. Presented panel modular system allows us—in a small area of the base which is occupied by vertical, sloping, arched-barrel, spherical, cylindrical and sloping cylindrical structure—to obtain a living cubic content of vegetating plants multiplied by a dozen or even several dozen times, which is valuable in areas of dense building development, where there are spatial restrictions and where there are few or no biologically active areas.

The principle of bipolar planting of plants on panels is used in relation to the intensity of illuminating the surface of panels within the structure.

Differentiation of the edges of individual layers of the layered wall structure, which is created as a result of assembling the panels/modules, is aimed at optimizing the illumination of the surface of all the panels that make up a given module by means of both direct and reflected sunrays. —obtaining rainwater for plant irrigation (apart from the employed irrigation system). —the possibility of the growth of some plants over a fixed distance between the top of the substrate layer and the bottom of the panel which is placed above, thanks to the fact that the panels do not overlap with each other in the vertical plane, which enables the use of plants growing over this fixed distance. —scattering of reflected sound waves.

With the load-bearing structure used in the vertical, sloping, arched-barrel, spherical, cylindrical and sloping cylindrical structure of the layered wall, it is also possible to employ only panels without plant matter within the whole structure due to the two main goals of the solution. Presented panel-modular system combining two variables: horizontal and vertical is a fusion of their functionality. The solution combines in one: a flat or spatial load-bearing plane—vertical, sloping, arched-barrel, spherical, cylindrical and sloping cylindrical and the maximum of horizontal area for plant vegetation, in the form of layers made up of joined sideways panels connected by vertical silos filled with the substrate, with an appropriately optimized front shape, in terms of illumination, rainwater harvesting and plant vegetation, using a suitable substrate in combination with water and mineral plant supply, which gives a high degree of independence from the environment in which the system is installed. A fair-sized ecosystem, which is a single layer or a specifically combined set of layers, improves the proper vegetation of plants, making them more resistant to the minima of a temperate climate in winter and also to extremes of a hot and dry climate in summer.

The system according to the invention is shown in the drawing which presents:

FIG. 1. Panel-modular layered wall system—scheme of climatic interaction in the urban environment. I. Sun radiation (short wave); {ultraviolet (7% energy), visible (45% energy), infrared (47% energy)}. Penetration of solar radiation into the layered structure through: a. Skylight placed at the top level of the object, b. Clearances between layers. 2. Thermal radiation (long-wave) emitted by the earth's surface and atmosphere. 3. Reflected solar radiation particularly intense in urbanised areas. 4. Local convection currents. 5. Impact of the structure on the ambient climate—cooling of so-called heat islands in cities. 6. Microclimate inside the structure.

Figure 2:
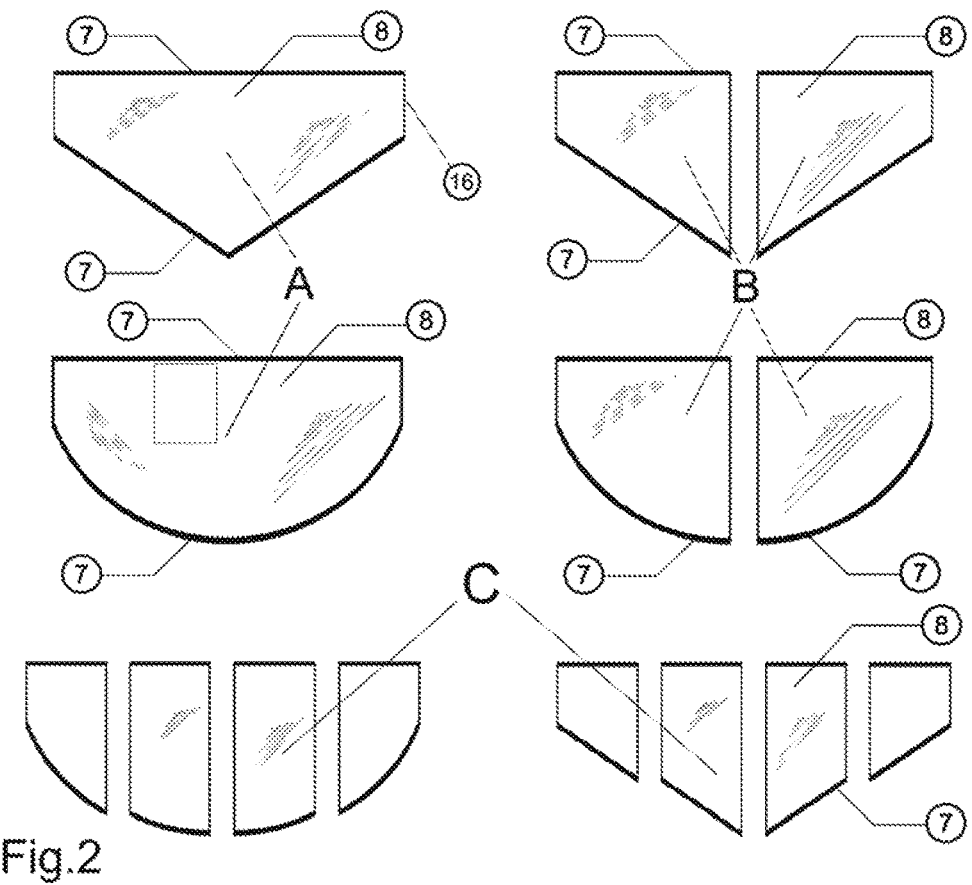

FIG. 2: Panels mounted on a rhombus and a square frame; A). whole panels (visible a hole for a silo), B). half panels, C) supplementary panels; 7. Panel bands, 8. Panel plane, 16. Joining side.

FIG. 3 Types of cantilevers; 10. Cantilevers with a 90 degrees angle in three sizes (side view); 11. Mounting hooks for cantilevers. 13. Cantilevers for mounting on the sloping and arched construction, 40. Guide bar rail with docking holes (top view), 41. Elements of guide bars, 42. Fastening clamp.

FIG. 4. Whole panel with a visible hole for a silo, 40. Guide bar rails, (view from the bottom of the panel).

FIG. 5. Rhombus-shaped frame, 12. Mounting holes of cantilevers on the module frame, FIG. 6. Square frame; 12. Mounting holes of cantilevers;

FIG. 7. Types of frames of additional modules, 12. Mounting holes of cantilevers on the module frame, 14. Frames of complementary modules with the flat frame, 15. Halves of whole frames used as flat and bent frames.

FIG. 8 Joining elements of panels, 7. Panel band, 8. Panel plane, 16 Panel joining side, 20. Drain-pipes, 43. Silo, 44. Hole for panel joining strip, 45. Panel expansion joint, 46. Panel joining strip, 47. Guide bar for panel band, 48. Expansion joint elements.

FIG. 9 Layer joining silo, 49. Comb placed on three sides of the silo in prepared holes; a). top view, b). front view, c). side view.

FIG. 10. Filling strip between panels in the spherical, cylindrical and sloping cylindrical structure. 7. Band, 51. Filling strip (top view, bottom view), 52. expansion joint elements.

FIG. 11. element. 54. Arrangement of the panels on the top layer of the spherical structure, (view from below), 55. Arrangement of the panels on the central layer of the spherical structure (view from above), 56. Loop in which the bolt joining the panels and the joining strip is placed.

Figure 12:
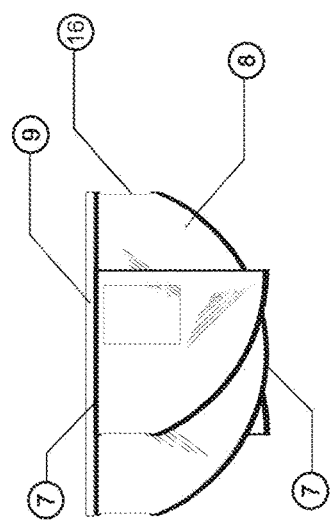

FIG. 12. Module on the rhombus frame, 7. Panel bands, 8. Panel plane, 9. Panel frame, 16. Panel joining side, (top view)

Figure 13:
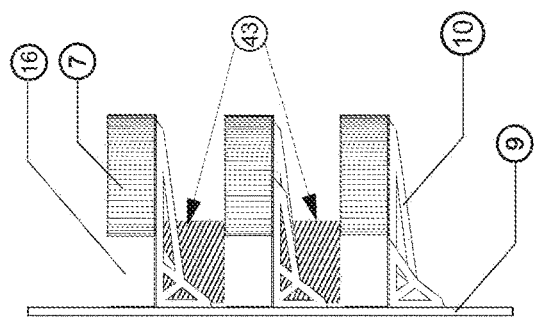

FIG. 13. Module with the rhombus frame, (side view), 7. Panel bands, 9. Panel frame, 10 Cantilevers, 16, Panel joining side where a given panel is joined to the adjacent panel.

Figure 14:
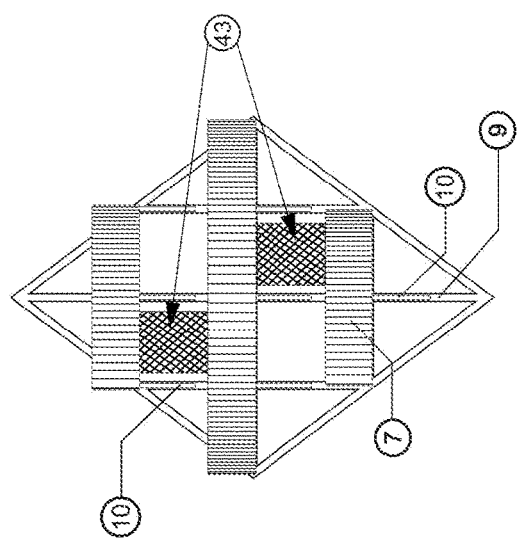

FIG. 14. Module with the rhombus frame, 7. Panel bands, 9. Panel frame, 10. Cantilevers, (front view).

Figure 16:
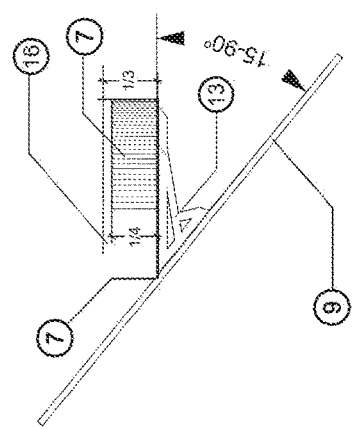
Figure 15:
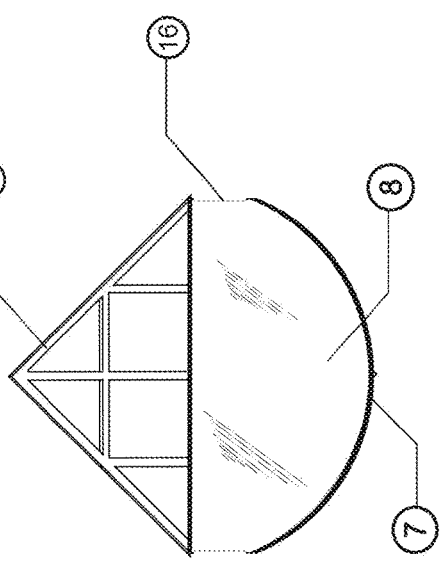

FIG. 15. Diagonally mounted module, 7. Panel bands, 8. Panel plane, 9. Panel frame, 16. Panel joining side without the band where a given panel is connected to the adjacent panel. (top view);

FIG. 16. Diagonally mounted module, 7. Panel sides, 9. Panel frame, 13. Diagonal cantilevers, 16. Joining side by which the panel is connected to the adjacent panel (side view).

Figure 17:
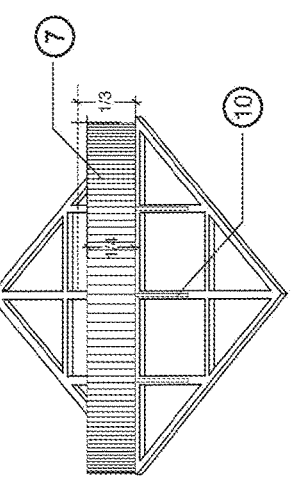

FIG. 17. Diagonally mounted module (front view); 7. Panel bands, 9. Panel frame, 13. Diagonal cantilevers.

Figure 18:
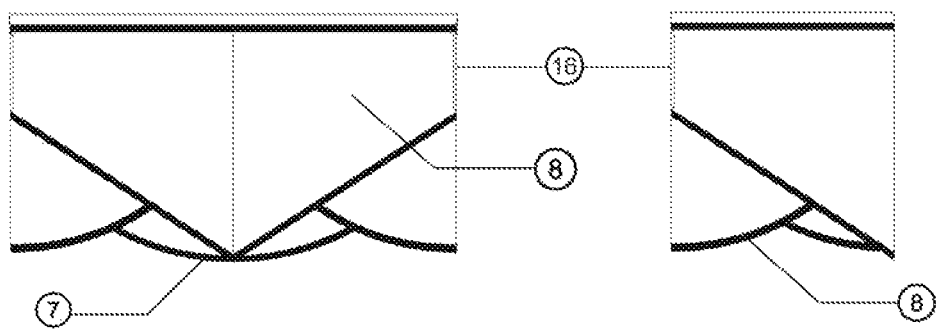
Figure 19:
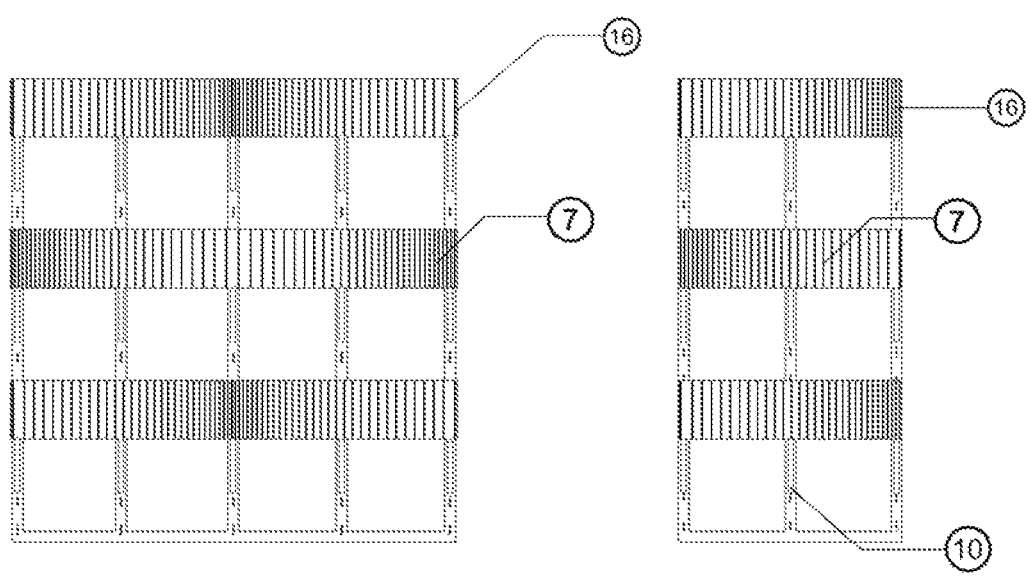
Figure 20:
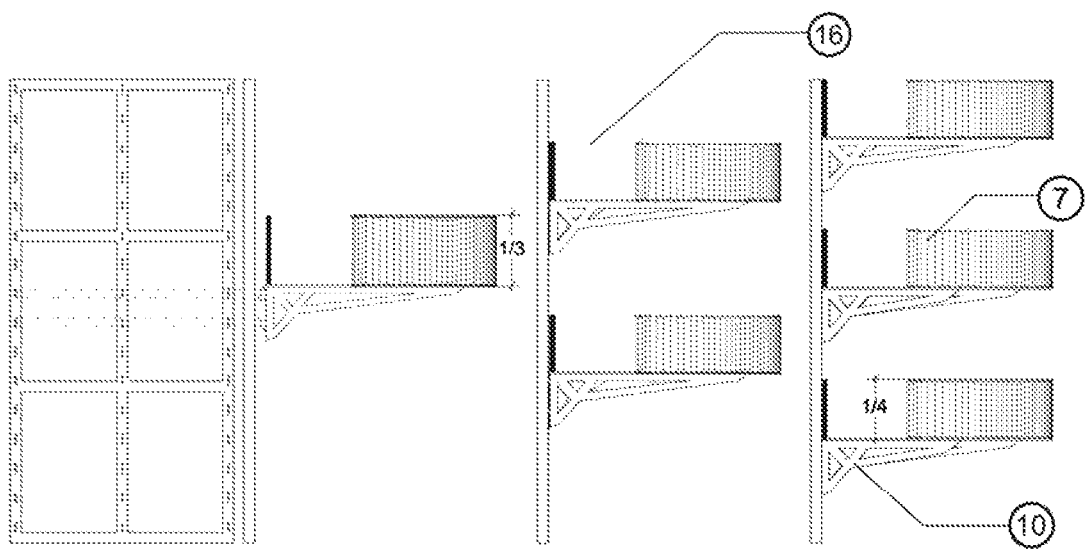

FIG. 18. Module on the rectangular frame, (top view); 7. Panel bands, 8. Panel plane, 16. Panel joining side;

FIG. 19. Module on the square/rectangular frame, (front view). 7. Panel bands, 16. Panel joining side;

FIG. 20. Module on square/rectangular frame, 7. Panel bands, 10. Cantilever, 16. Panel joining side. (side view).

Figure 21:
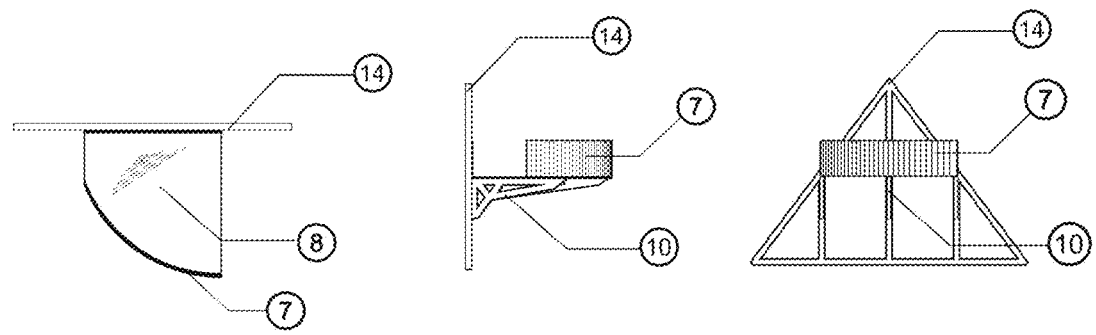

FIG. 21. Views of complementary module with basic panels, type A (top, side, front view). 7. Panel band, 8. Panel plane, 10. Cantilevers, 15. Complementary panel frame.

Figure 22:
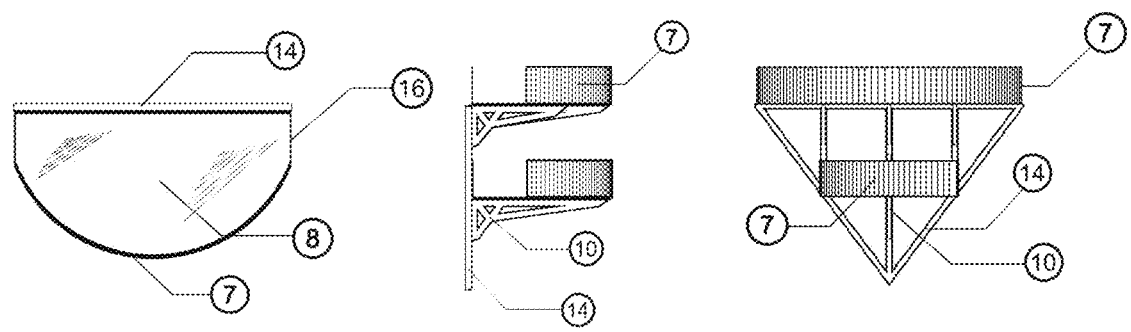

FIG. 22. Views of complementary module with basic panels, type B, (top, side, front view). 7. Panel band, 8. Panel plane, 10 Cantilevers, 15. Complementary panel frame.

Figure 23:
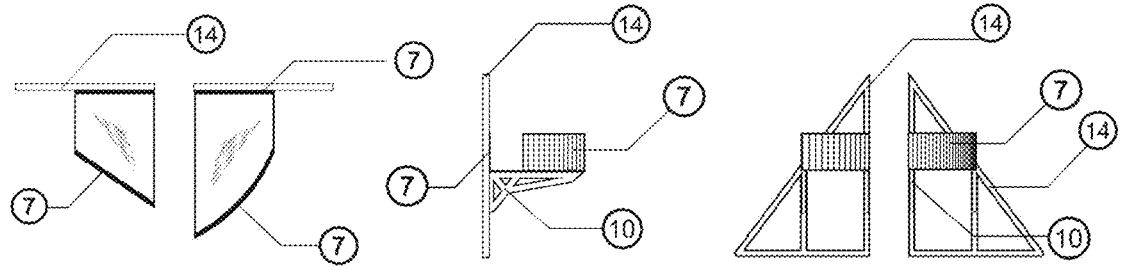

FIG. 23. Views of complementary module with basic panels, type C, (top, side, front view). 7. Panel band, 8. Panel plane, 10. Cantilevers, 15. Complementary panel frame.

Figure 24:
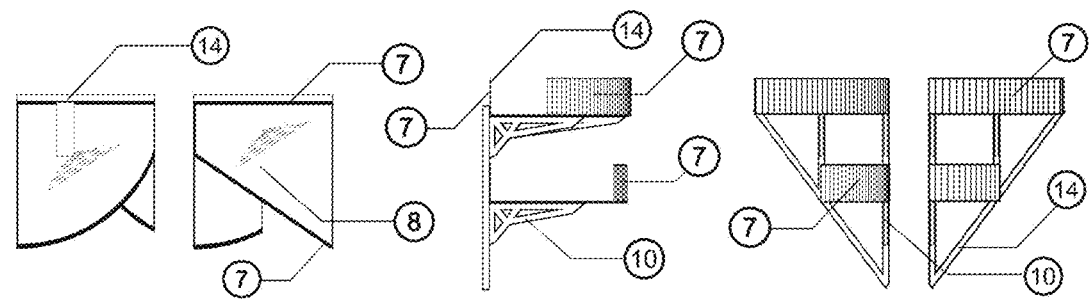

FIG. 24. Views of complementary module with basic panels, type D, (top, side, front view), 7. Panel band, 8. Panel plane, 10. Cantilevers, 15. Complementary panel frame.

Figure 25:
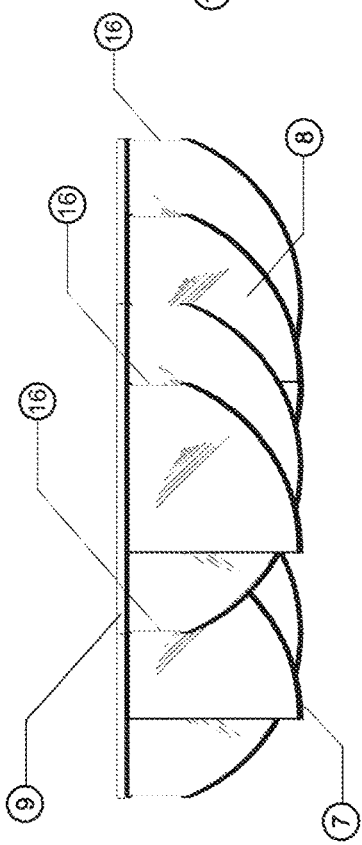

FIG. 25. Example of assembling modules on the rhombus frame in the vertical structure. 7. Panel bands, 9. Panel frame, 10. Cantilevers, 16. Panel joining side where a given panel is connected to the adjacent panel (top view).

Figure 26:
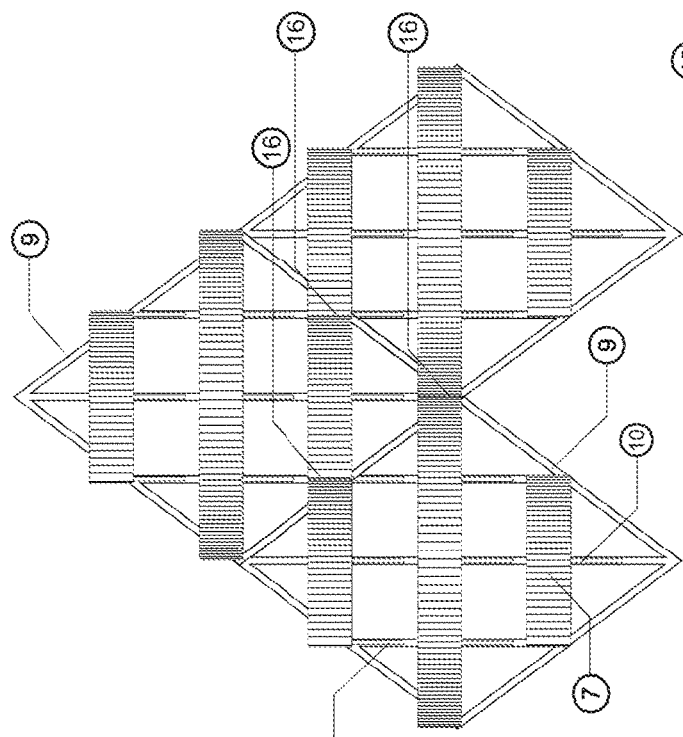

FIG. 26. Example of assembling modules on the rhombus frame in the vertical structure, 7. Panel bands, 9. Panel frame, 10. Cantilevers, 16. Panel joining side where a given panel is connected to the adjacent panel (front view).

Figure 27:
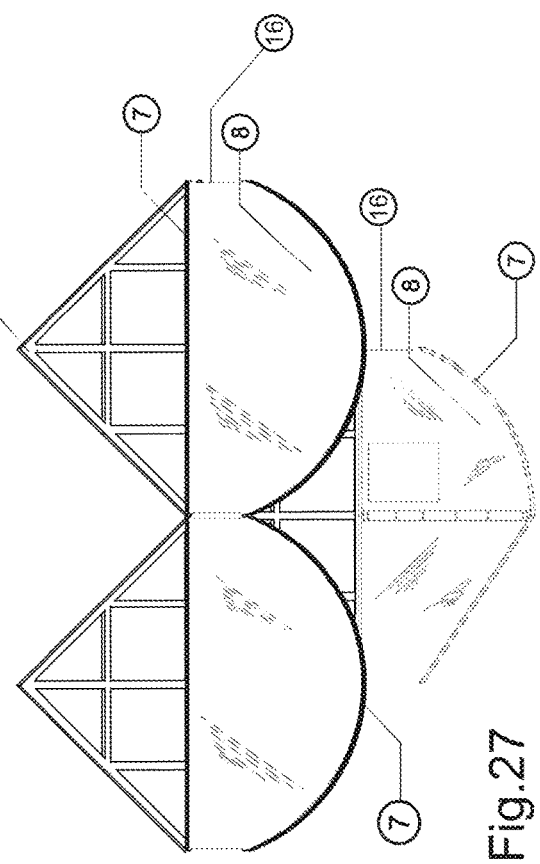

FIG. 27. Example of assembling modules on the rhombus frame in the sloping structure using whole and half panels, 7. Panel sides, 8. Panel plane, 9. Panel frame, 16. Panel joining side where the panel joins the adjacent panel (top view).

Figure 28:
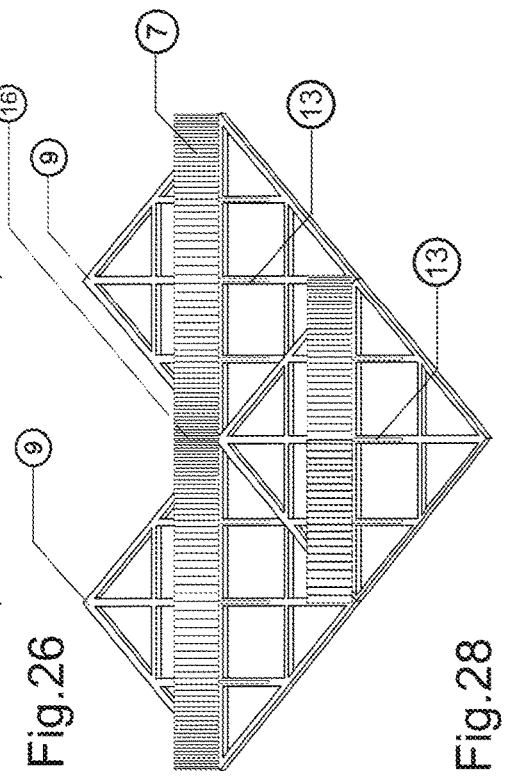

FIG. 28. Example of assembling modules on the rhombus frame in the sloping structure (front view); 7. Panel bands, 9. Panel frame, 13. Diagonal cantilevers 16. Panel joining side where the panel joins the adjacent panel.

Figure 29:
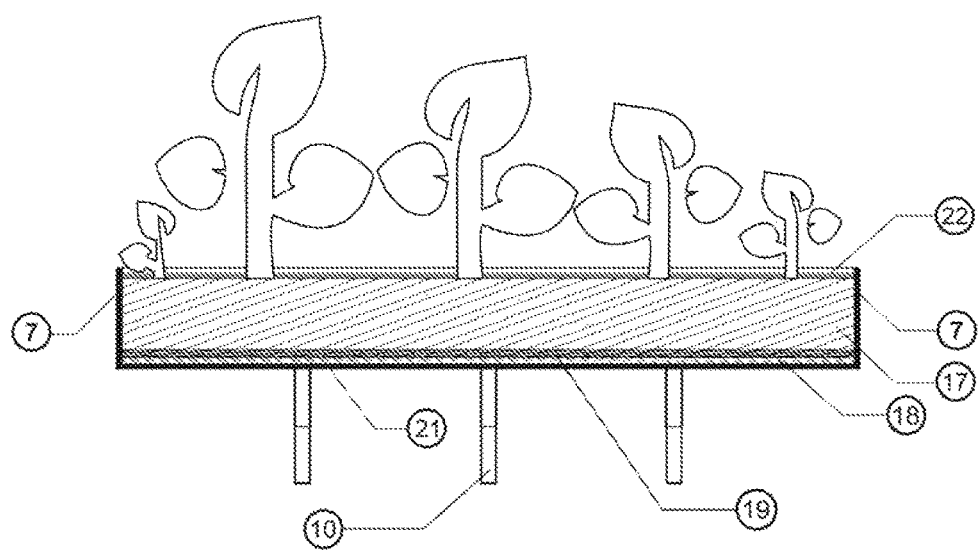

FIG. 29. Components of a single module panel (using the example of the whole panel); 7. Panel band, 10. Cantilevers, 17. Substrate layer, 18. Expanded clay layer, 19. Thermal insulation layer, 20. Drain-pipes, 21. Panel base, 22. Irrigation pipes (front view).

Figure 30:
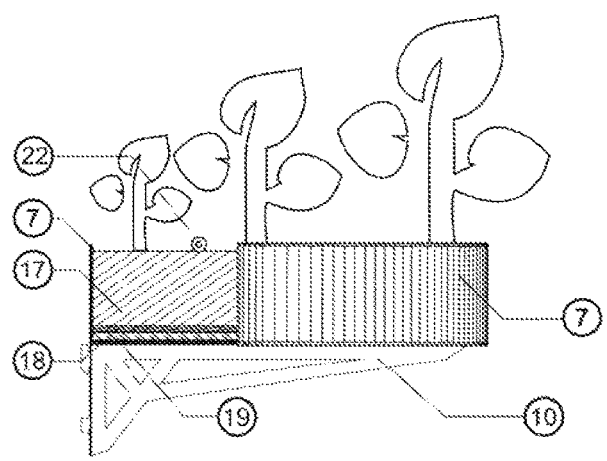

FIG. 30. Components of the panel, 7. Panel band, 10. Cantilevers, 17. Substrate layer, 18. Expanded clay layer, 19. moisture barrier layer, 20. Drain-pipes, 22. Irrigation pipes (side view).

Figure 31:
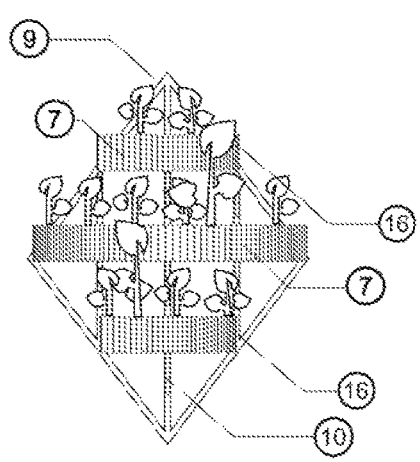

FIG. 31. Module on the rhombus frame with plants. 7. Panel bands, 9. Panel frame, 10. Cantilevers, 16. Joining gap on the side of the panel where the panel joins the adjacent panel (front view).

Figure 32:
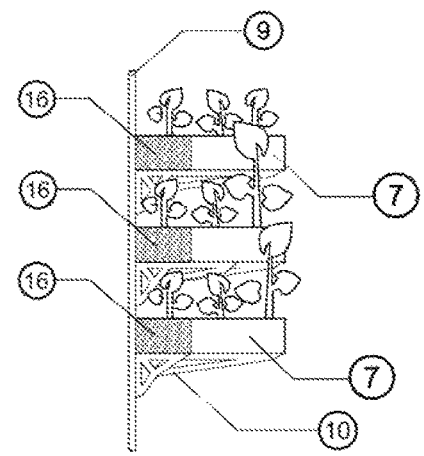

FIG. 32. Module on the rhombus frame with plants. 7. Panel bands, 9. Panel frame, 10. Cantilevers, 16. Joining gap on the side of the panel where the panel joins the adjacent panel, 17. Substrate. (Side view).

Figure 33:
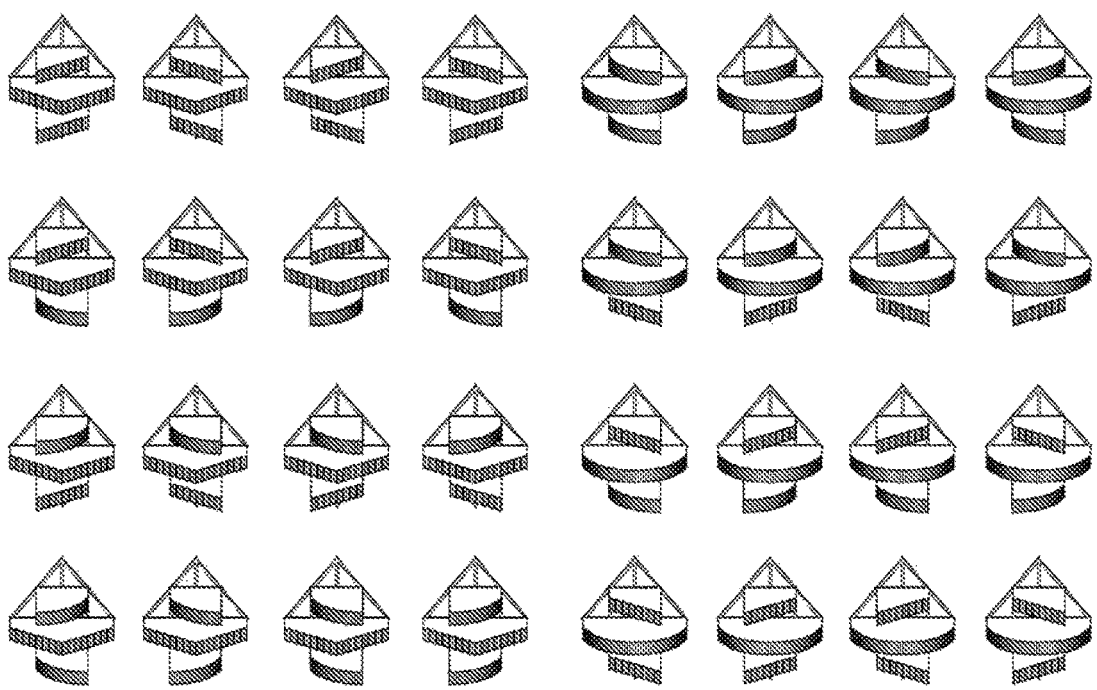

FIG. 33. 32. Visually different combinations of panels on the rhombus frame.

Figure 34:
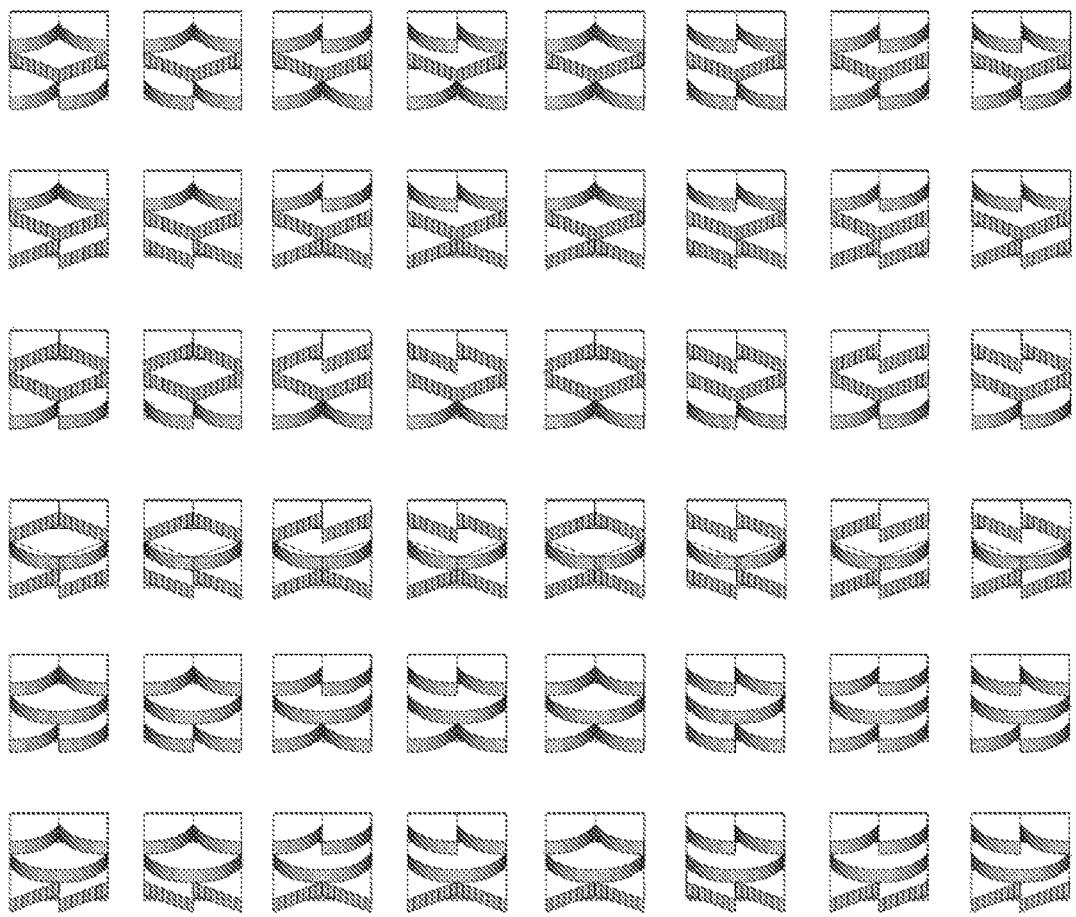

FIG. 34. Sample combinations of 6 panels in the basic module configuration, (perspective view) on the square-shaped frame.

FIG. 35. Views of couplers for joining frames, A) front and rear view, B) side view, (C) perspective, assembly view.

FIG. 36. Joining points of rhombus-shaped frames. (rear view). 37. Clamps.

FIG. 37. Joining points of square frames, 37. Couplers. (front view)

FIG. 38. Structure in an open arrangement on the plane of the building wall, 8. Panel plane, 27. Load-bearing frame of the structure with a concrete foundation; (top view).

FIG. 39. Structure in an open arrangement on the plane of the building wall, 27. Stabilizing frame with a concrete foundation, 43. Silos joining the panel layers, (side view).

FIG. 40. Structure in an open arrangement on the wall of the building elevation with variable distances between panels joined by silos. 23. Construction frame, 28. Automatic irrigation system, 29. Concrete mast footings of the construction frame, 43. Silos, (front view).

FIG. 41. Structure in an open arrangement on the wall of the building elevation with variable distances between panels joined by silos. (Perspective view).

FIG. 42. Structure in an open arrangement built of rhombus frames with fixed distances between layers, 8. Panel plane, 27. Stabilizing frame, (top view).

FIG. 43. Structure in an open arrangement, made of rhombus frames, free-standing, (side view).

FIG. 44. Structure in open arrangement made of rhombus frames, free-standing, 7. Panel bands, 27. Stabilizing frame, 28. Automatic irrigation system, 29. Concrete foundation, (Front view).

FIG. 45. Structure in an open arrangement using whole semi-circular, triangular and half panels, including supplementary panels, assembled at random on the elevation. (Perspective View).

Figure 46:
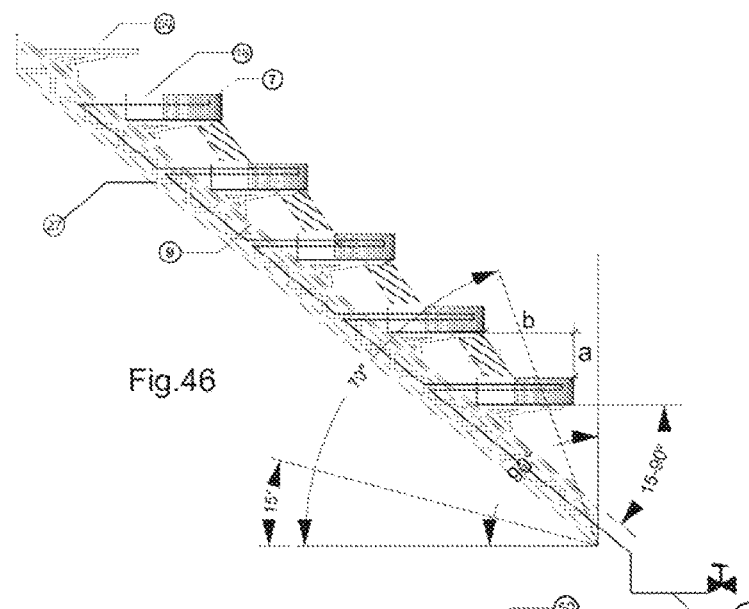

FIG. 46. Sloping structure; a) fixed distance between the surface of the panel plane; b) fixed distance between panel fronts, 7. Bands, 9. Module frame, 13. Cantilever, 16. Panel joining place, 27. Element supporting the structure made of modules, 28. Automatic irrigation system, 43. Silos, 50. Panels without plant matter, transparent, photovoltaic, etc. (side view).

Figure 47:
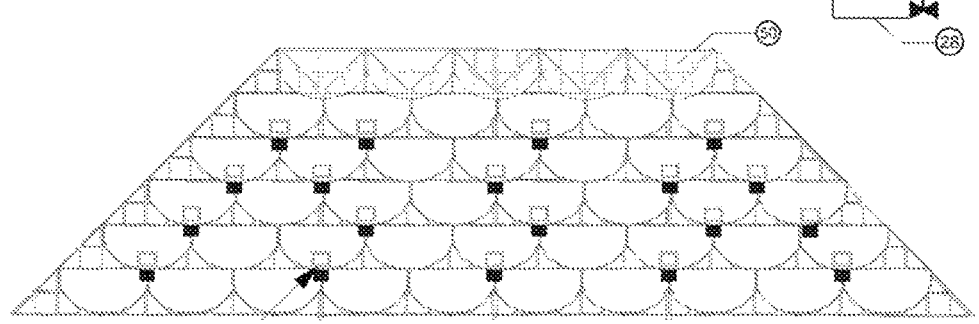

FIG. 47. Sloping structure, 43. Silos. 50. Panels without plant matter, transparent, photovoltaic, (top view).

Figure 48:
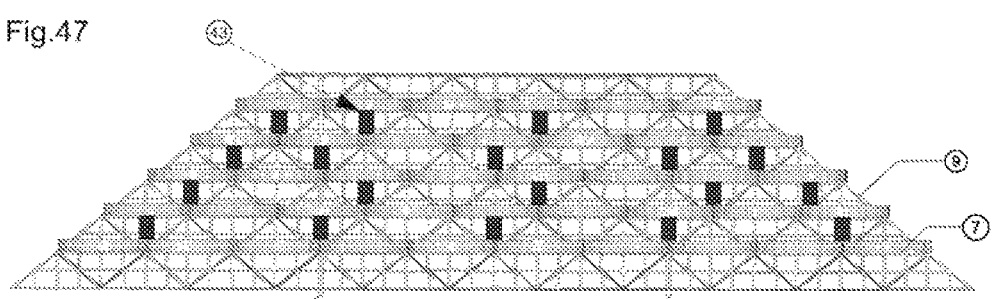

FIG. 48. Sloping structure; 7. Bands, 9. Module frame, 27. Element supporting the structure made of modules, 43. Silos (front view).

Figure 49:
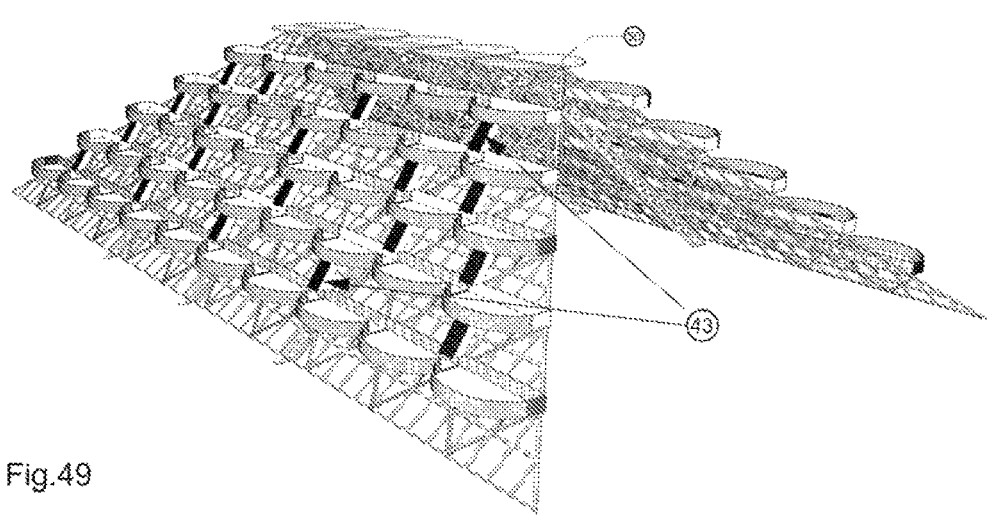

FIG. 49. Sloping structure, possibility of roofing, 43. Silos, 50. Panels without plant matter, transparent, photovoltaic. (perspective view).

Figure 50:
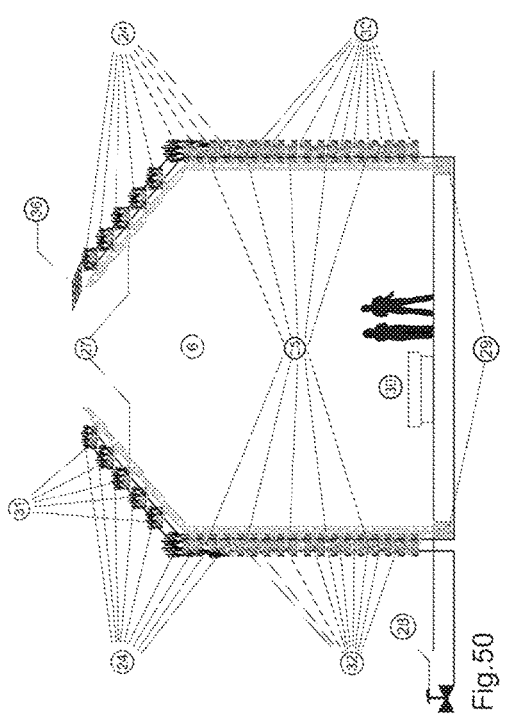

FIG. 50. Structure with a closed arrangement. 6. Microclimate inside the structure. 24. Photophilic plants planted from the outer and top side of the structure, 25. Shade-loving plants planted from the inner side of the structure, 30. Stone benches and tables accumulating cold during hot days and keeping warm during the night, optionally. 27. Constructional elements to which a set of modules is mounted. 28. Automatic irrigation system, 29. Concrete feet of load-bearing frame, 31. Panels mounted diagonally on the frame forming the roofing, 32. Panels, 36. Photovoltaic panels, optionally, (Cross-section).

Figure 51:
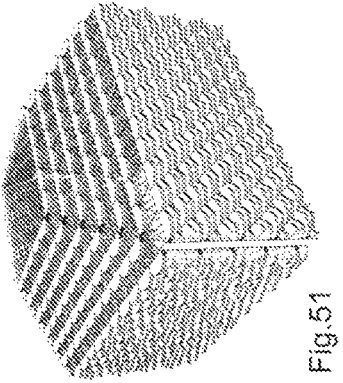

FIG. 51. Structure with a closed arrangement. (Perspective view).

Figure 52:
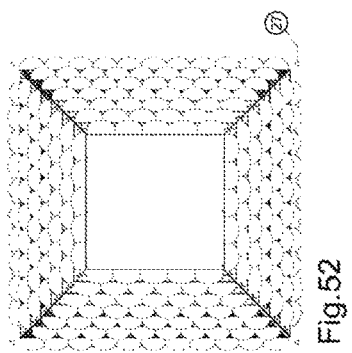

FIG. 52. Structure with a closed arrangement. 27. Constructional elements of the structure to which the modules are mounted. (top view).

Figure 53:
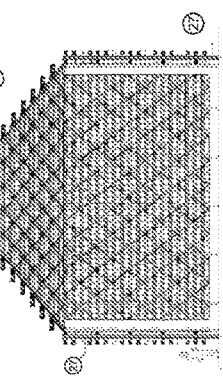

FIG. 53. Structure with a closed arrangement. 26. Sloping structure covering the structure of the tetrahedron of the Layered Wall. 27. Constructional elements to which a set of modules is mounted. (Side view).

Figure 54:
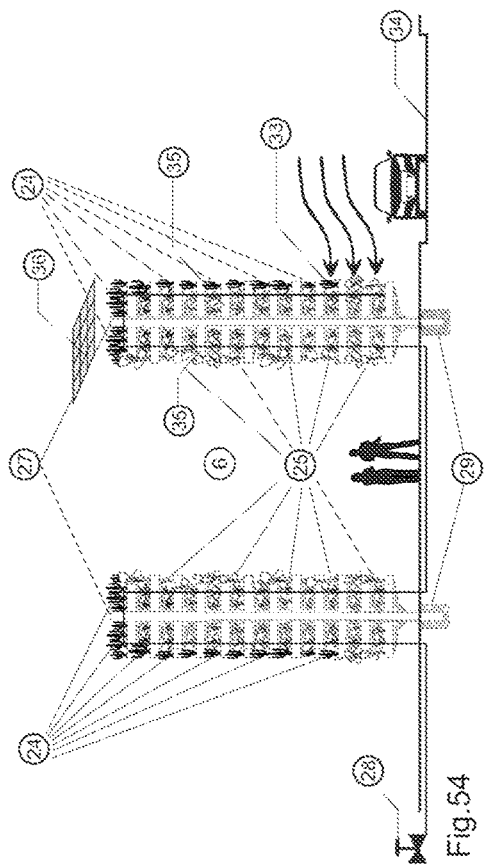

FIG. 54. Structure in the semi-closed arrangement in a double version. 6. Microclimate inside the structure coming from soil and plants in relation to the closest surroundings of the object. 24. Photophilic plants planted from the outer and top side of the structure, 25. Shade-loving plants planted from the inner side of the structure. 27. Constructional elements to which a set of modules is mounted. 28. Automatic plant irrigation system, 29. Concrete mast footings of the construction frame, 33. Blocking the movement of fine dust and pollution in the form of burnt hydrocarbons. 34. Car traffic lane, 35. Layered wall made of panels mounted on vertical frames of the modules which form a free-standing element of the structure on the structural frame. 36. Photovoltaic panels, optionally. (Cross section).

Figure 55:
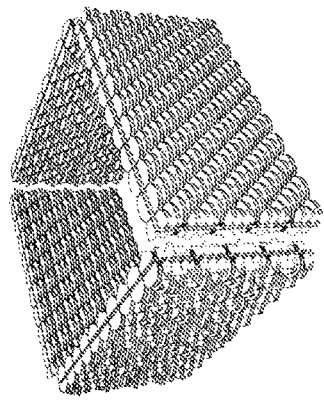

FIG. 55. Structure in a semi-closed arrangement in a double version. (Perspective view).

Figure 56:
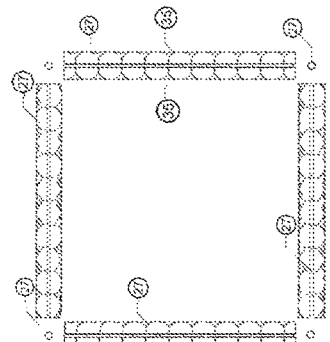

FIG. 56. Structure in a semi-closed arrangement in a double version. 27. Constructional elements to which a set of modules is mounted, 35. Layered wall in a double arrangement (top view).

Figure 57:

FIG. 57. Structure in a semi-closed arrangement in a double version. 27. Constructional masts of the structure embedded in the ground (side view).

FIG. 58 Module on the bent frame used in the arched structure, 7. Bands, 8. Panel, 13. Cantilever, 16. Panel joining side, 36. Bent frame of the module (top view).

FIG. 59 Module on the bent frame used in the arched structure 7. Bands, 8. Panel, 13. Cantilever, 16. Panel joining side, 36. Bent frame of the module (side view).

FIG. 60 Arched structure with the use of the frame of the modules with a fixed deflection angle, 7. Bands, 8. Panel, 13. Cantilever, 16. Panel joining side, 36. Bent frame of the module, (front view).

FIG. 61 Half modules on the bent frame, used in the arched structure, 7. Bands, 8. Panel, 16. Panel joining side, 36. Bent frame of the module, (top view).

FIG. 62 Arched structure; half modules on the bent frame, 7. Bands, 13. Cantilever, 36. Bent frame of the module, (front view).

Figure 63:
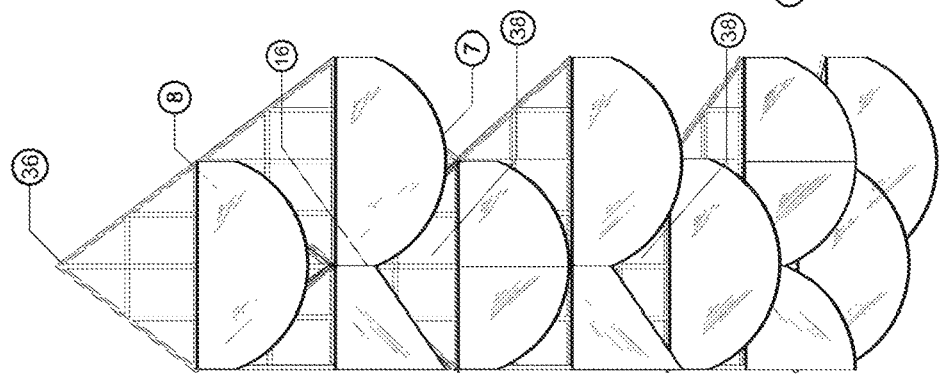

FIG. 63. Edge of the arched structure with the use of the frame with a fixed deflection angle, 7. Bands, 8. Panel, 13. Cantilever, 16. Panel joining side, 36. Bent frame of the module, 38. Clearances for illuminating the interior (top view).

Figure 64:
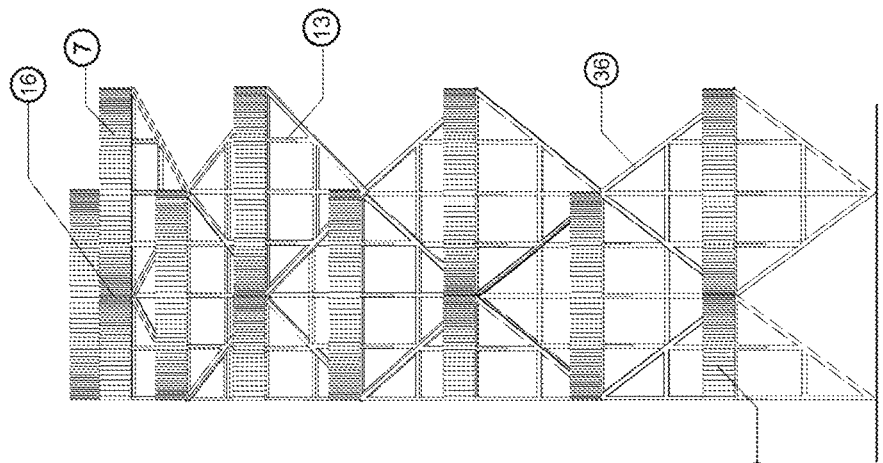

FIG. 64 Edge of the arched structure with the use of the frame with a fixed deflection angle, 7. Bands. 13. Cantilever, 16. Panel joining side, 36. Bent frame of the module, (front view).

Figure 65:
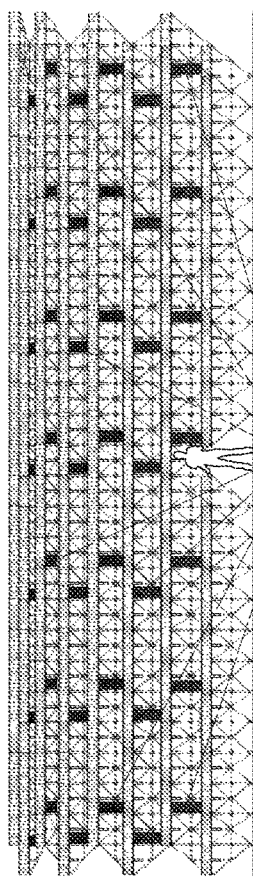

FIG. 65 Arched structure with the use of the module frame with a fixed deflection angle, 43. Silos. (side view).

Figure 66:
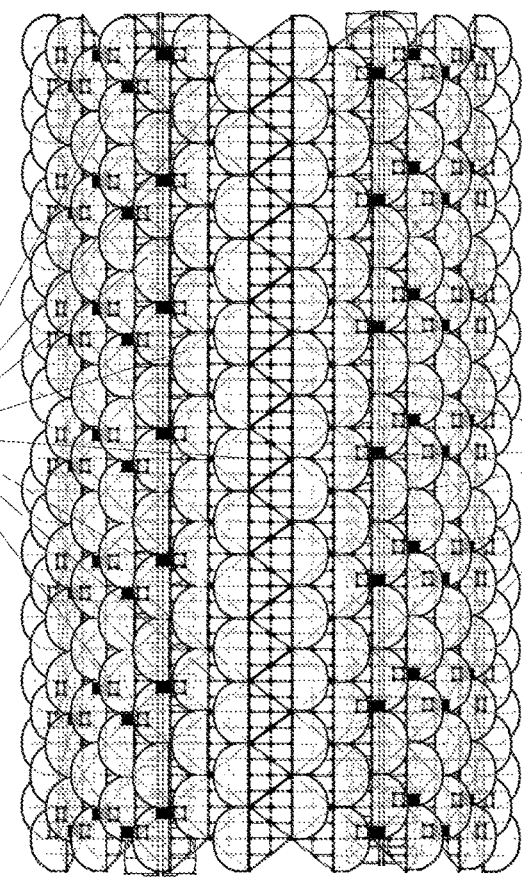

FIG. 66 Arched structure with the use of the module frame with a fixed deflection angle, 38. Adjustable clearances for illuminating the interior, 39. Arched construction (top view).

Figure 67:
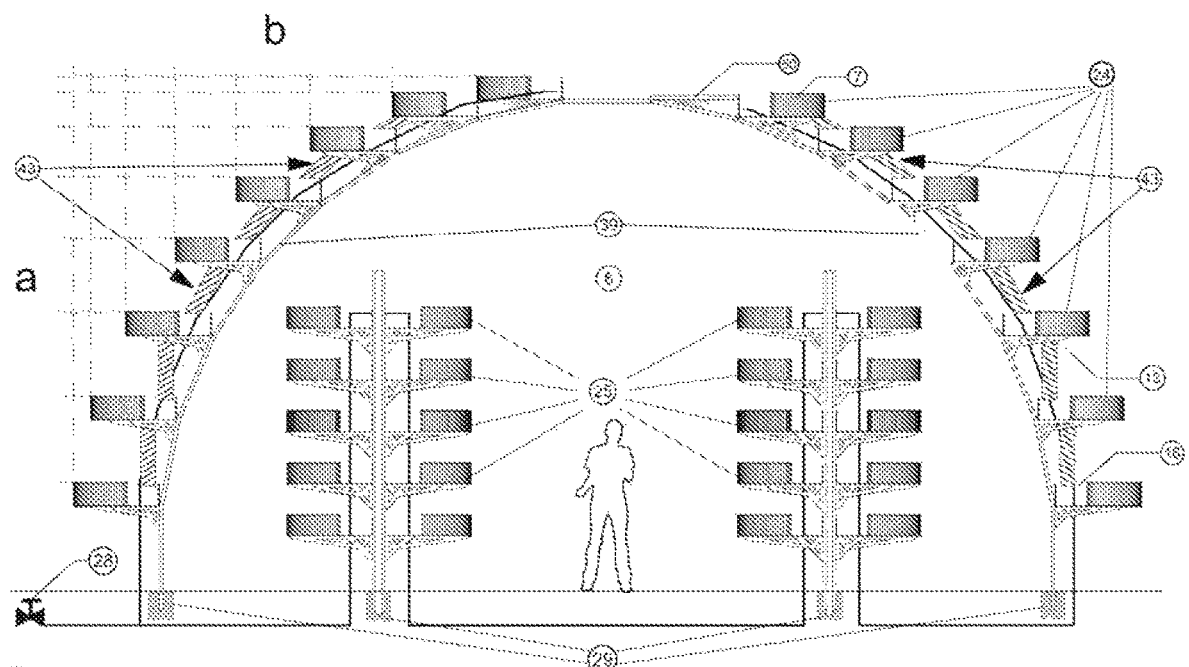

FIG. 67 Arched structure with the use of module frames with a fixed deflection angle; 6. Microclimate inside the structure, 7. Bands, 8. Panel, 13. Cantilever, 16. Panel joining side, 24. Panels with photophilic plants, 25. Panels with shade-loving plants, 28. Plant irrigation system, 29. Concrete footings of constructional frame, 39. Arched construction (cross-section view), 43. Silos, 50. Panels without plant matter—transparent, photovoltaic, etc.

Figure 68:
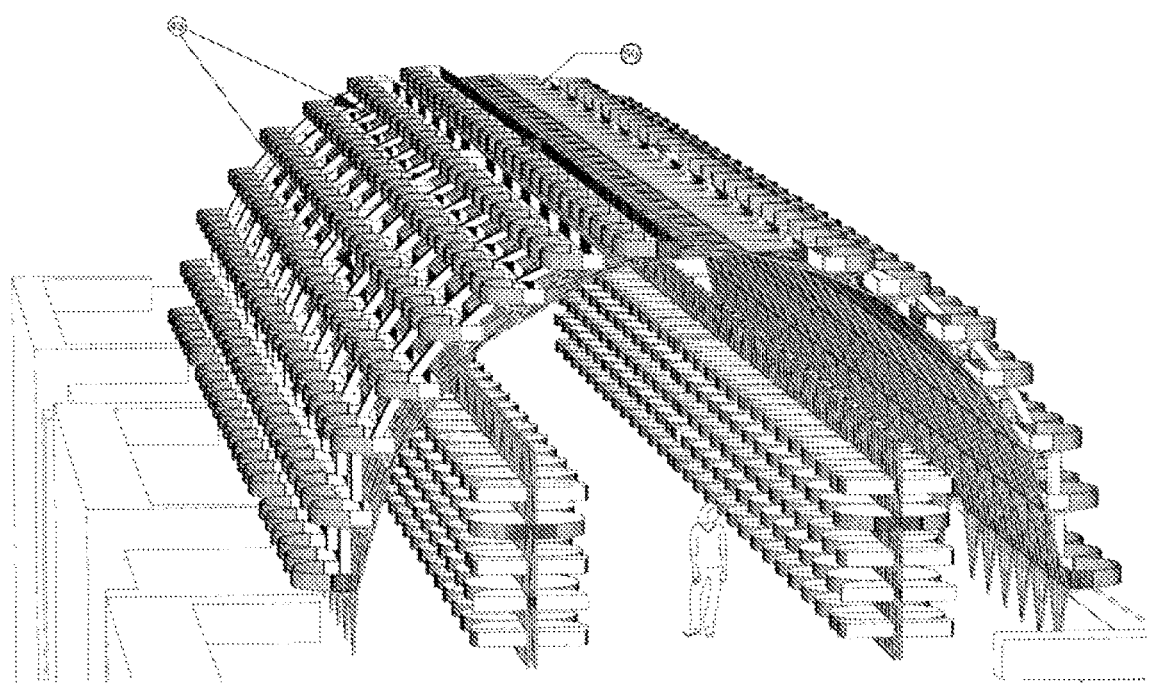

FIG. 68 Arched structure with the use of module frames with a fixed deflection angle on the roof of the building with elements of vertical structures placed inside, 43. Silos, 50. Transparent panels. (perspective).

Figures 69, 70, 71:
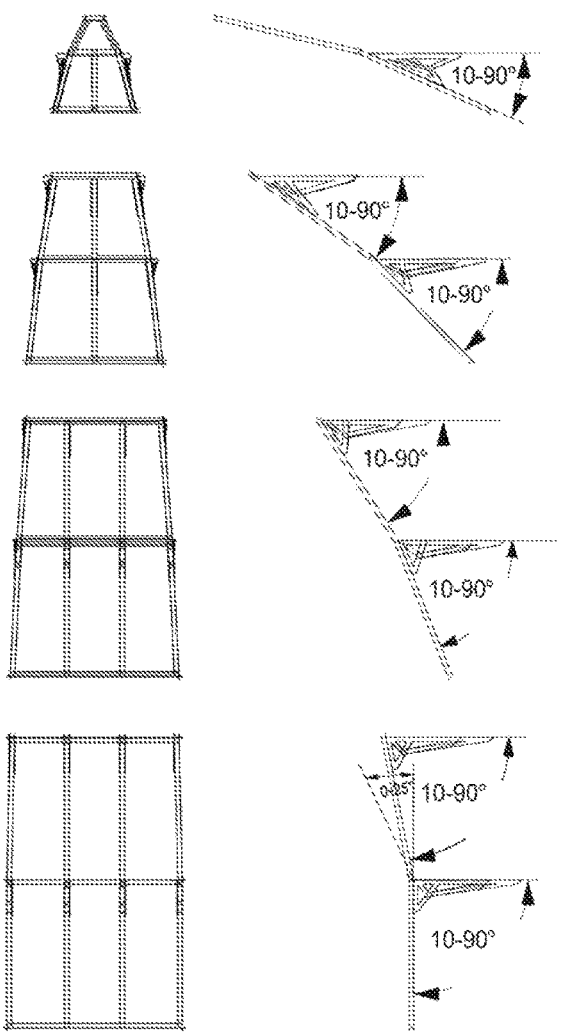
Figure 72:
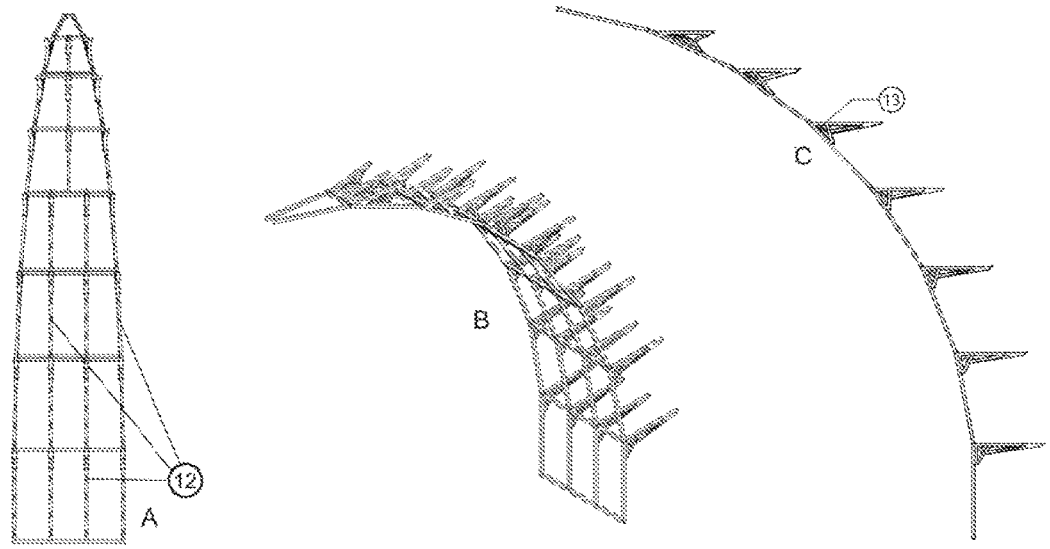
Figure 73:
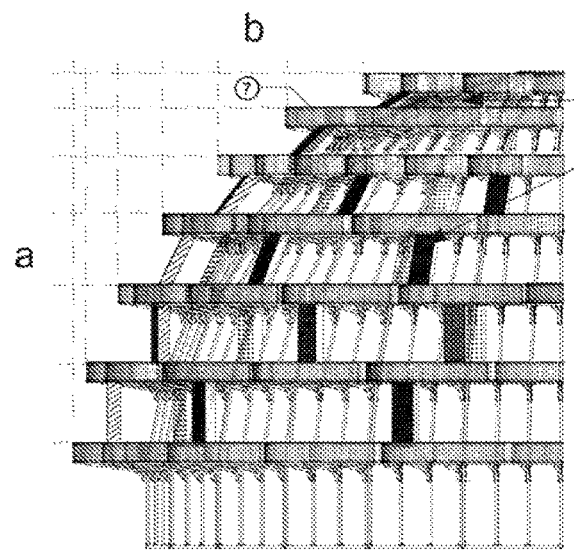

FIG. 69. Trapezium-shaped frames used in the spherical structure (front view), FIG. 70. Trapezium-shaped frames (side view), FIG. 71. Spherical load-bearing frame (top view of the construction), FIG. 72. Fragment of the arch out of trapezium frames forming the spherical load-bearing frame, A). (front view), 12. Mounting holes of cantilevers, B). (perspective view), C). (side view), 13. Cantilever;

FIG. 73. Spherical structure, a) distances between panel surfaces, b) distances between panel fronts, 7. Bands, 43. Silos, (side view).

Figure 74:
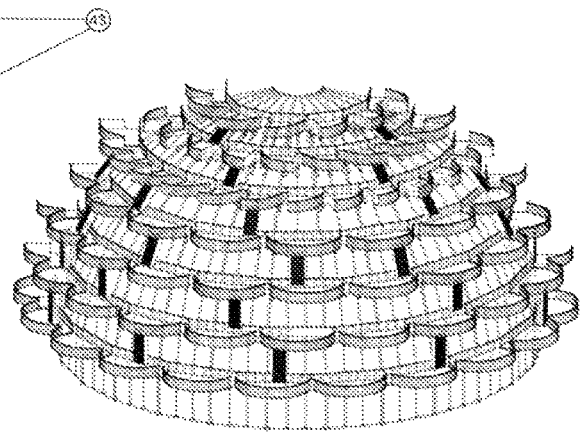
Figure 75:
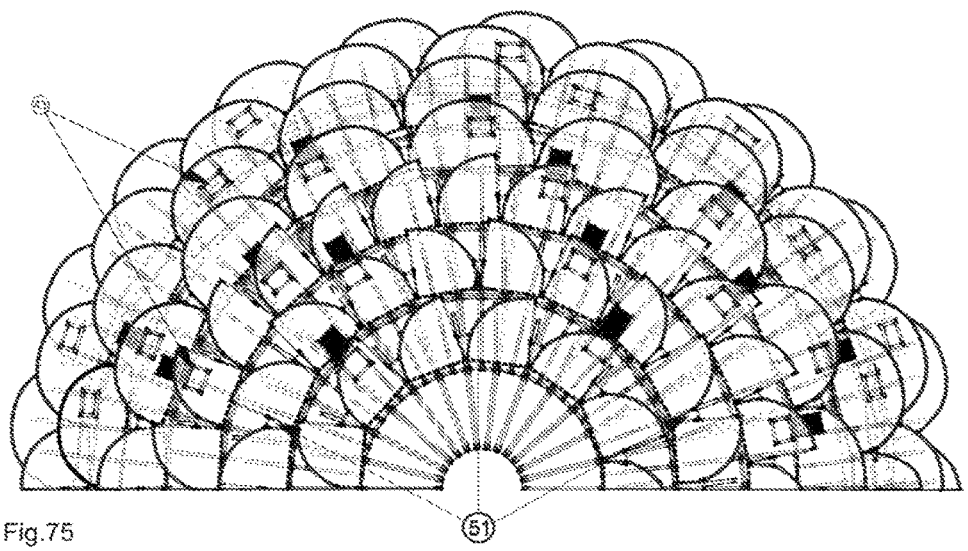
Figure 76:
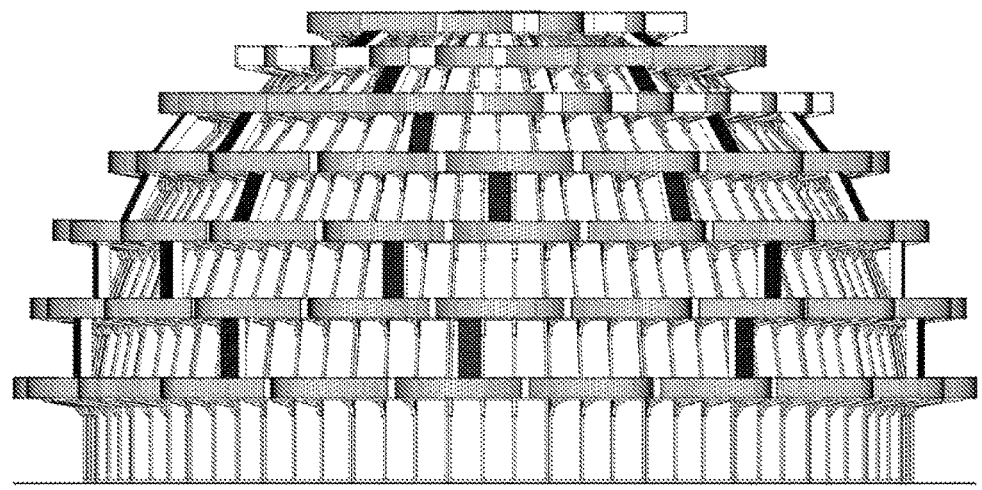

FIG. 74. Spherical structure, (perspective), FIG. 75. Spherical structure, 43. Silos, 51. Filling strip (top view), FIG. 76. Spherical structure, (front view).

Figure 77:
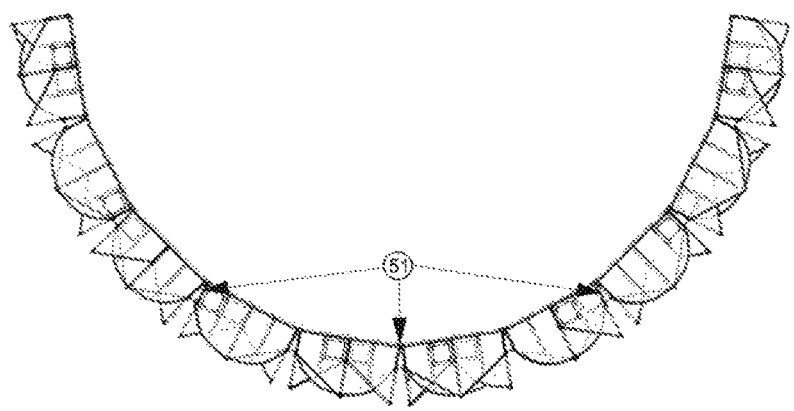
Figure 78:
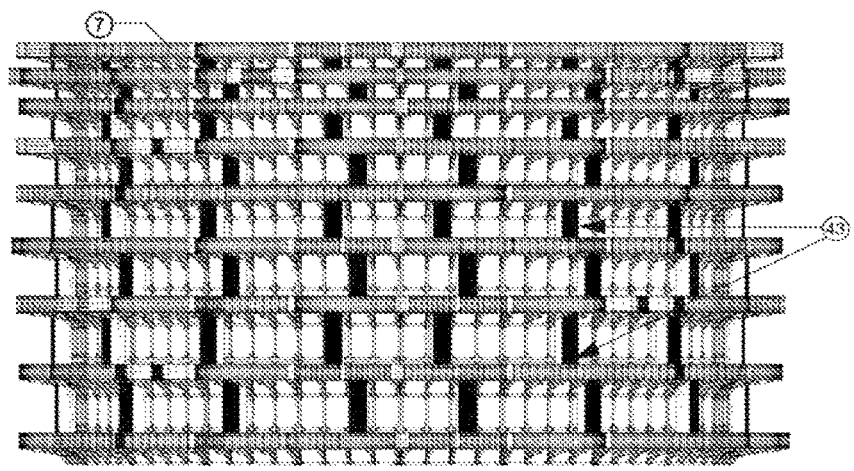
Figure 79:
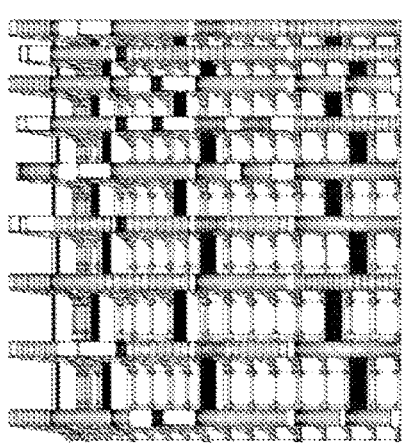
Figure 80:
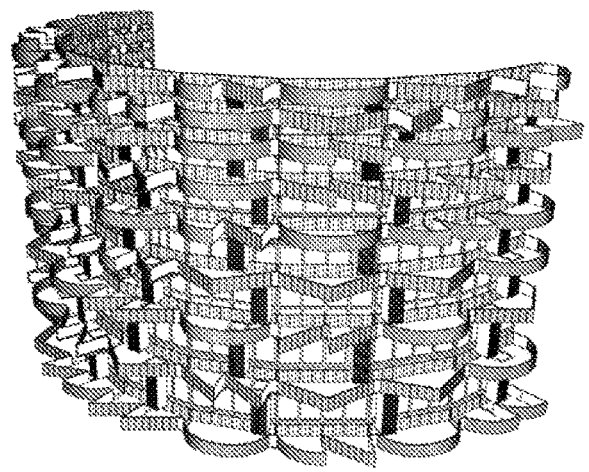
Figure 89:
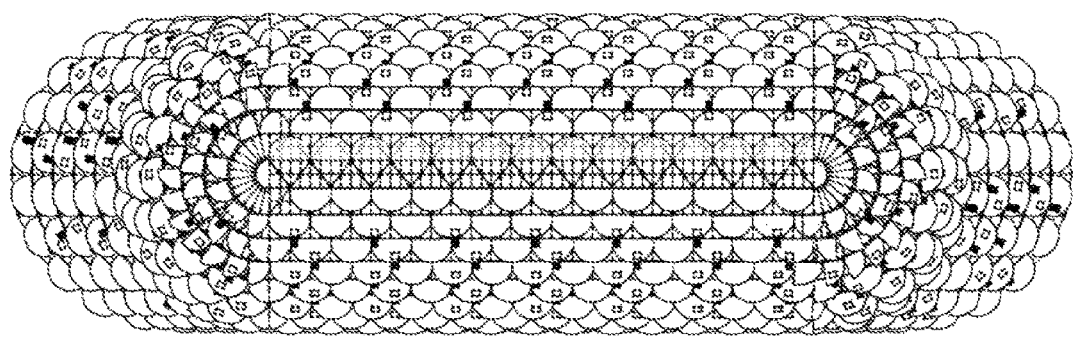
Figure 90:
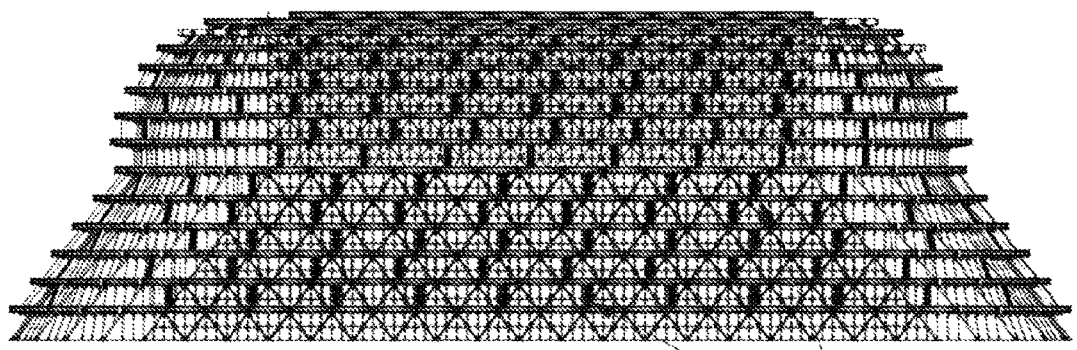
Figure 91:
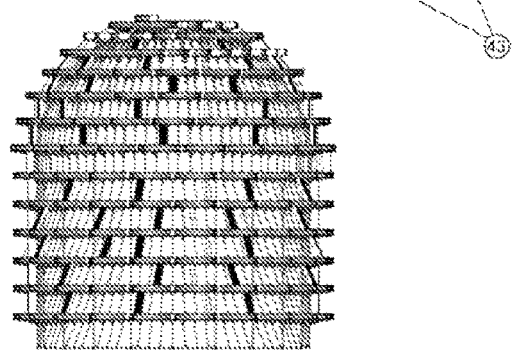
Figure 92:
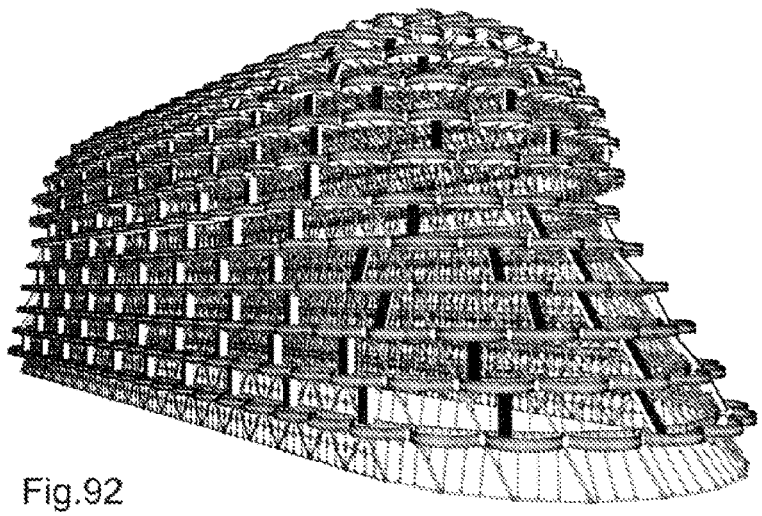

FIG. 77. Cylindrical structure, 51. Complementary strips (top view), 51. Filling strip, 78. Cylindrical structure, 7. Bands, 43. Silos, (front view), 79. Cylindrical structure (side view), FIG. 80. Cylindrical structure (perspective), FIG. 81. Sloping cylindrical structure, load-bearing element (top view), FIG. 82. Sloping cylindrical structure, load-bearing element (front view), FIG. 83. Sloping cylindrical, load-bearing element (side view), FIG. 84. Sloping cylindrical structure, load-bearing frames of the structure, a,b,c,d,e: (top view, side view, cross-section view), FIG. 85. Sloping cylindrical structure 51. Filling strip (top view), FIG. 86. Sloping cylindrical structure (front view), FIG. 87. Sloping cylindrical structure, (side view), FIG. 88. Sloping cylindrical structure (perspective), FIG. 89. Structure composed of elements of vertical, barrel-arched, spherical and sloping cylindrical diagonal structure (top view), FIG. 90. Composite structure 43. Silos (side view), FIG. 91. Composite structure (cross-section view), FIG. 92. Composite structure (perspective).

EXAMPLES OF AN EXECUTION

Example I

The panel-modular system of the layered wall for shaping spatial structures according to the invention contains modules, each of which is a combination of a layered, horizontal arrangement of panels, placed no more than three on a frame made of a closed profile with a rectangular cross-section, together with placed on them vegetating plants on the substrate layer. The frames of the modules are joined together in such a way that they form the flat vertical, flat sloping, arched-barrel, spherical, cylindrical and sloping cylindrical load-bearing frame together with applied vertical silos filled with the substrate, joining individual panels and horizontal layers, creating layered "green" wall structures with a horizontal arrangement of layers in six variants as self-supporting structures.

The panels are selected in such a way that the system elements consist of 2 whole panels, 4 half panels. In addition, the system consists of cooperating with panels, panel joining strips, panel docking strips, cantilevers with a fixed deflection angle or variable deflection angle within the structure in the range of 10 to 90 degrees, the lock of panel cantilevers, two types of module frames, flat and bent in the middle part in the range of 0 to 25 degrees in the shape of a rhombus and a rectangle and frames resulting from the division, frame couplers, silos with an inclination angle from 30 to 90 degrees, as well as panel bands.

The panels, which are not enclosed by bands, appear exclusively as devoid of plants, with a full or transparent filling, and they are therefore mounted on the module frame in a closer sequence of distances between the panel planes.

The frames of modules are joined by means of couplers, made of thick, profiled metal sheet, bent into a "u" shape with two welded threaded pins located in the inner part of the clamp. Holes in which threaded pins of the clamp joining both frames enter are placed on the perimeter of the whole frame at regular intervals. On the opposite side of the hole into which the pin enters there is a mounting hole for a socket wrench and a self-locking nut which is bolted onto the pin. The mounting hole is located on the outer side of the structure where cantilevers and panels are mounted on the frames. Flat frames are joined by means of couplers where threaded pins are placed parallel next to each other inside the coupler of channel section shape FIG. 35A.

In addition, as a separate arrangement the system according to the invention comprises the irrigation system for plants; and the substrate for plants and the method of planting them are selected within the structure according to a bipolar key.

The flat load-bearing plane on which the panels of the system are mounted according to the invention is formed by the flat frames of rhombus shape or halves and quarters of a rhombus, which are joined sideways diagonally and the frames in the shape of a rectangle and the frames constituting a half of its shape, which are joined sideways by means of couplers, and on which the panels are mounted filled with the substrate with plants, another adjacent layers of these panels are joined by vertical silos. The layers of the system according to the invention are held by cantilevers with a 90 degree supporting angle. The load-bearing plane as a whole is assembled vertically in relation to the ground and forms the vertical structure of the layered wall.

On the vertical trellises of rectangular frames and frames in the shapes resulting from their division by ½, ¼, ⅛ there are mounting holes for cantilevers, at regular intervals from the top to the bottom of the frame, which correspond to the spacing of mounting hooks for cantilevers supporting panels in 4 types of layered wall structures, thus the distances between the created planes of layers of panels can be freely adjusted within these structures.

Within the structures of the front of the panels, in the case of a flat plane, starting from the layer of panels placed closest to the ground up to the top one, the panels are in one plane, while surfaces of the horizontal cross-sections of the panels do not coincide with each other in a top view, but pass each other.

Each panel consists of the base and bands, keeping the moist substrate with plants inside the panel. The height of the bands is normally ¼ of the panel depth when the panels are mounted on three levels on the module frame and up to ⅓ of the panel depth when using a double or single panel on the module frame. The bottom and bands of the panel are lined with an insulating layer of polystyrene and insulating foil in particular, which are covered with a layer of expanded clay and the substrate with plants. The bands are placed in the guide bar bolted to the edge of the panel, encircling each whole panel around except for parts of both its sides along the panel width, and "truncated" on the sides at a 90 degrees angle to the plane of the module frame, by which they butt the adjacent panels on both sides at more than ⅓ of the depth of each panel. In this way, they form a horizontal layer, stretching along the layered wall structure. The half panels are joined sideways on one side at ⅓ of the panel depth and on the other side for the whole panel depth. Each panel, joining the adjacent panels, creates a long level, stretching along the whole layered wall structure. The layer of the substrate can be thick in the range of 15 to 35 cm.

The silos joining the layers are fully filled on three sides, while their front is covered with a fine weave mesh. The silos have an inclination angle of 30 to 90 degrees as seen in a side view of the structure, and panels with a hole for the silo together with the silo located there are placed every third whole panel without a hole, within a given layer made of panels. The silos have holes for combs made of rods which are put from three sides at fixed distances at the height of the silo.

The irrigation system is installed in all the module panels forming together layers and the panel-modular system. On each layer there is a separate controller that doses the amount of water due to the requirements of the plants placed there. The irrigation system is connected to a continuous water supply or to a replenished tank with a pump which guarantees a continuous water supply to the irrigation system. The water supply varies depending on the season of the year, needs and type of plants, e.g. shade-loving or photophilic plants, spatial and climatic location of the structure. Rainwater is obtained by means of an appropriate scale of panel planes and configuration of layers, and through vertical silos it is distributed within the joint system of the layer wall, which, in the case of regular rainfall, may result in periodic shutdown of the irrigation system.

On the layered wall created with the help of the system according to the invention, plants are placed according to the principle of bipolarity. On the outer and better illuminated parts of the panel, photophilic plants are placed, and on the inner and lower layers of the structure, shade-loving plants.

Example II

The panel-modular system of the layered wall for shaping spatial structures according to the invention contains modules, each of which is a combination of a layered, horizontal arrangement of panels, placed no more than three on a frame made of a closed profile with a rectangular cross-section, together with placed on them vegetating plants on the substrate layer. The frames of the modules are joined together in such a way that they form the flat load-bearing frame together with applied vertical silos filled with the substrate, joining individual panels and horizontal layers, creating layered "green" wall structures with a horizontal arrangement of layers in six variants as self-supporting structures.

The panels are selected in such a way that the system elements consist of 2 whole panels, 4 half panels. In addition, the system consists of cooperating with panels, panel joining strips, panel docking strips, cantilevers with a fixed deflection angle or variable deflection angle within the structure in the range of 10 to 90 degrees, the lock of panel cantilevers, two types of module frames, flat and bent in the middle part in the range of 0 to 25 degrees in the shape of a rhombus and rectangle and frames resulting from the division, frame couplers, silos with an inclination angle from 30 to 90 degrees, as well as preferably panel bands.

The panels, which are not enclosed by bands, appear exclusively as devoid of plants, with a full or transparent filling, and they are therefore mounted on the module frame in a closer sequence of distances between the panel planes.

The frames of modules are joined by means of couplers, made in particular of thick, profiled metal sheet, bent into a "u" shape with two welded threaded pins located in the inner part of the clamp. Holes in which threaded pins of the clamp joining both frames enter are placed on the perimeter of the whole frame at regular intervals. On the opposite side of the hole into which the pin enters there is a mounting hole for a socket wrench and a self-locking nut which is bolted onto the pin. The mounting hole is located on the outer side of the structure where cantilevers and panels are mounted on the frames. Flat frames are joined by means of couplers where threaded pins are placed parallel next to each other inside the coupler of channel section shape FIG. 35A.

In addition, as a separate arrangement the system according to the invention comprises the irrigation system for plants, and the substrate for plants and the method of planting them are selected within the structure according to a bipolar key.

The flat load-bearing plane on which the panels of the system are mounted according to the invention is formed by the flat frames of rhombus shape or halves and quarters of a rhombus, which are joined sideways diagonally and the frames in the shape of a rectangle and the frames constituting a half of its shape, which are joined sideways by means of couplers, and on which the panels are mounted filled with the substrate with plants, another adjacent layers of these panels are joined by vertical silos. The layers of the system according to the invention are held by cantilevers with a 90 degree supporting angle. The load-bearing plane as a whole is assembled vertically in relation to the ground and forms the vertical structure of the layered wall.

On the elements of vertical trellises of rectangular frames and frames in the shapes resulting from their division by ½, ¼, ⅛ there are mounting holes for cantilevers, at regular intervals from the top to the bottom of the frame, which correspond to the spacing of mounting hooks for cantilevers supporting panels in 6 types of layered wall structures, thus the distances between the created planes of layers of panels can be freely adjusted within these structures.

Within the structures of the front of the panels, starting from the layer of panels placed closest to the ground up to the top one, the panels are in one plane, while surfaces of the horizontal cross-sections of the panels do not coincide with each other in a top view, but pass each other.

A characteristic feature of the sloping flat layered wall structure is a much greater exposure of the whole panel surfaces to light and rainwater because the panel fronts, depending on the inclination of the plane, are distant from each other and do not remain in one plane as in the vertical flat layered wall structure.

Each panel consists of the base and bands, keeping the moist substrate with plants inside the panel. The height of the bands is normally ¼ of the panel depth when the panels are mounted on three levels on the module frame and up to ⅓ of the panel depth when using a double or single panel on the module frame. The bottom and bands of the panel are lined with an insulating layer of polystyrene and insulating foil in particular, which are covered with a layer of expanded clay and the substrate with plants. The bands are placed in the guide bar bolted to the edge of the panel, encircling each whole panel around except for parts of both its sides along the panel width, and "truncated" on the sides at a 90 degrees angle to the plane of the module frame, by which they butt the adjacent panels on both sides at more than ⅓ of the depth of each panel. In this way, they form a horizontal layer, stretching along the layered wall structure. The half panels are joined sideways on one side at ⅓ of the panel depth and on the other side for the whole panel depth. Each panel, joining the adjacent panels, creates a long level, stretching along the whole layered wall structure.

The layer of the substrate is thick in the range of 15 to 35 cm.

The silos joining the layers are fully filled on three sides, while their front is covered with a fine weave mesh. The silos have an inclination angle of 30 to 90 degrees as seen in a side view of the structure, and panels with a hole for the silo together with the hole located there are placed every third whole panel without a hole, within a given layer made of panels. The silos have holes for combs made of rods which are put from three sides at fixed distances at the height of the silo.

The irrigation system is installed in all the module panels forming together layers and the panel-modular system. On each layer there is a separate controller that doses the amount of water due to the requirements of the plants placed there. The irrigation system is connected to a continuous water supply or to a replenished tank with a pump which guarantees a continuous water supply to the irrigation system. The water supply varies depending on the season of the year, needs and type of plants, e.g. shade-loving or photophilic plants, spatial and climatic location of the structure. Rainwater is obtained by means of an appropriate scale of panel planes and configuration of layers, and through vertical silos it is distributed within the joint system of the layer wall, which, in the case of regular rainfall, may result in periodic shutdown of the irrigation system.

On the layered wall created with the help of the system according to the invention, plants are placed according to the principle of bipolarity. On the outer and better illuminated parts of the panel, photophilic plants are placed, and on the inner and lower layers of the structure, shade-loving plants.

Example III

The panel-modular system of the layered wall for shaping spatial structures according to the invention contains modules, each of which is a combination of a layered, horizontal arrangement of panels, placed no more than three on a frame made of a closed profile with a rectangular cross-section, together with placed on them vegetating plants on the substrate layer. The frames of the modules are joined together in such a way that they form the arched-barrel together with applied vertical silos filled with the substrate, joining individual panels and horizontal layers, creating layered "green" wall structures with a horizontal arrangement of layers in six variants as self-supporting structures.

The panels are selected in such a way that the system elements consist of 2 whole panels, 4 half panels. In addition, the system consists of cooperating with panels, panel joining strips, panel docking strips, cantilevers with a fixed deflection angle or variable deflection angle within the structure in the range of 10 to 90 degrees, the lock of panel cantilevers, two types of module frames, flat and bent in the middle part in the range of 0 to 25 degrees in the shape of a rhombus and rectangle and frames resulting from the division, frame couplers, silos with an inclination angle from 30 to 90 degrees, as well as panel bands.

The panels, which are not enclosed by bands, appear exclusively as devoid of plants, with a full or transparent filling, and they are therefore mounted on the module frame in a closer sequence of distances between the panel planes.

The frames of modules are joined by means of couplers, made in particular of thick, profiled metal sheet, bent into a "u" shape with two welded threaded pins located in the inner part of the clamp. Holes in which threaded pins of the clamp joining both frames enter are placed on the perimeter of the whole frame at regular intervals. On the opposite side of the hole into which the pin enters there is a mounting hole for a socket wrench and a self-locking nut which is bolted onto the pin. The mounting hole is located on the outer side of the structure where cantilevers and panels are mounted on the frames. Flat frames are joined by means of couplers where threaded pins are placed parallel next to each other inside the coupler of channel section shape FIG. 35A.

In addition, as a separate arrangement the system according to the invention comprises the irrigation system for plants, and the substrate for plants and the method of planting them are selected within the structure according to a bipolar key.

The arched-barrel load-bearing plane on which the panels of the system are mounted according to the invention is formed by the bent module frames of rhombus shape or halves and quarters of a rhombus, which are joined sideways diagonally together with couplers with angles in the range of 25 to 90 degrees and in the shape of a rectangle and a square, bent symmetrically in the middle part at an angle in the range of 0 to 25 degrees, they are joined sideways diagonally or with a shift by means of couplers and form together the arched-barrel load-bearing frame of the layered wall, on which the panels are mounted filled with the substrate with plants, joined by vertical silos, and/or the panels with a transparent or 100% opaque filling, which are combined together in layers directed perpendicularly to the arch of the structure and horizontally to the ground supported by cantilevers with a supporting angle in the range of 10 to 90 degrees, which form the arched-barrel structure of the layered wall.

On the elements of the vertical trellises of rectangular frames and frames in the shapes resulting from their division by ½, ¼, ⅛ there are mounting holes for cantilevers, at regular intervals from the top to the bottom of the frame, which correspond to the spacing of mounting hooks for cantilevers supporting panels in 6 types of layered wall structures, thus the distances between the created planes of layers of panels can be freely adjusted within these structures.

A characteristic feature of the arched-barrel flat layered wall structure is a much greater exposure of the whole panel surfaces to light and rainwater because the panel fronts, depending on the plane of the arch, are distancing from each other and do not remain in one plane as in the flat vertical, cylindrical or flat sloping layered wall.

Each panel consists of the base and bands, keeping the moist substrate with plants inside the panel. The height of the bands is normally ¼ of the panel depth when the panels are mounted on three levels on the module frame and up to ⅓ of the panel depth when using a double or single panel on the module frame. The bottom and bands of the panel are lined with an insulating layer of polystyrene and insulating foil in particular, which are covered with a layer of expanded clay and the substrate with plants. The bands are placed in the guide bar bolted to the edge of the panel, encircling each whole panel around except for parts of both its sides along the panel width, and "truncated" on the sides at a 90 degrees angle to the plane of the module frame, by which they butt the adjacent panels on both sides at more than ⅓ of the depth of each panel. In this way, they form a horizontal layer, stretching along the layered wall structure. The half panels are joined sideways on one side at ⅓ of the panel depth and on the other side for the whole panel depth. Each panel, joining the adjacent panels, creates a long level, stretching along the whole layered wall structure. The layer of the substrate can be thick in the range of 15 to 35 cm.

The silos joining the layers are fully filled on three sides, while their front is covered with a fine weave mesh. The silos have an inclination angle of 30 to 90 degrees as seen in a side view of the structure, and panels with a hole for the silo together with the silo located there are placed every third whole panel without a hole, within a given layer made of panels. The silos have holes for combs made of rods which are put from three sides at fixed distances at the height of the silo.

The irrigation system is installed in all the module panels forming together layers and the panel-modular system. On each layer there is a separate controller that doses the amount of water due to the requirements of the plants placed there. The irrigation system is connected to a continuous water supply or to a replenished tank with a pump which guarantees a continuous water supply to the irrigation system. The water supply varies depending on the season of the year, needs and type of plants, e.g. shade-loving or photophilic plants, spatial and climatic location of the structure. Rainwater is obtained by means of an appropriate scale of panel planes and configuration of layers, and through vertical silos it is distributed within the joint system of the layer wall, which, in the case of regular rainfall, may result in periodic shutdown of the irrigation system.

On the layered wall created with the help of the system according to the invention, plants are placed according to the principle of bipolarity. On the outer and better illuminated parts of the panel, photophilic plants are placed, and on the inner and lower layers of the structure, shade-loving plants.

Example IV

The panel-modular system of the layered wall for shaping spatial structures according to the invention contains modules, each of which is a combination of a layered, horizontal arrangement of panels, placed no more than three on a frame made of a closed profile with a rectangular cross-section, together with placed on them vegetating plants on the substrate layer. The frames of the modules are joined together in such a way that they form the spherical load-bearing frame together with applied vertical silos filled with the substrate, joining individual panels and horizontal layers, creating layered "green" wall structures with a horizontal arrangement of layers in six variants as self-supporting structures.

The panels are selected in such a way that the system elements consist of 2 whole panels, 4 half panels. In addition, the system consists of cooperating with panels, panel joining strips, panel docking strips, cantilevers with a fixed deflection angle or variable deflection angle within the structure in the range of 10 to 90 degrees, the lock of panel cantilevers, two types of module frames, flat and bent in the middle part in the range of 0 to 25 degrees in the shape of a rhombus and rectangle and frames resulting from the division, frame couplers, silos with an inclination angle from 30 to 90 degrees, as well as panel bands.

The panels, which are not enclosed by bands, appear exclusively as devoid of plants, with a full or transparent filling, and they are therefore mounted on the module frame in a closer sequence of distances between the panel planes.

The frames of modules are joined by means of couplers, made in particular of thick, profiled metal sheet, bent into a "u" shape with two welded threaded pins located in the inner part of the clamp. Holes in which threaded pins of the clamp joining both frames enter are placed on the perimeter of the whole frame at regular intervals. On the opposite side of the hole into which the pin enters there is a mounting hole for a socket wrench and a self-locking nut which is bolted onto the pin. The mounting hole is located on the outer side of the structure where cantilevers and panels are mounted on the frames. The frames forming cylindrical (vertical and sloping) structures and spherical structures are joined by means of couplers bent in the middle at an angle in the range of 0 to 25 degrees according to the applied deflection of the frames of trapeziums or rhombuses FIG. 35B.

In addition, as a separate arrangement the system according to the invention comprises the irrigation system for plants, and the substrate for plants and the method of planting them are selected within the structure according to a bipolar key.

The spherical load-bearing plane on which the panels of the system are mounted according to the invention is formed by the module frames in the shape of a trapezium or a rhombus which are bent symmetrically in the middle part at an angle in the range of 0 to 25 and are joined sideways by means of couplers, creating together self-supporting spatial spherical construction of the layered wall, on which the panels are mounted filled with the substrate with plants, joined by vertical silos, and/or the panels with a transparent or 100% opaque filling, which are combined together in layers directed perpendicularly to the arch of the structure and horizontally to the ground supported by cantilevers with a supporting angle in the range of 10 to 90 degrees, which form the spherical structure of the layered wall.

On the elements of the vertical trellises of rectangular frames and frames in the shapes resulting from their division by ½, ¼, ⅛ there are mounting holes for cantilevers, at regular intervals from the top to the bottom of the frame, which correspond to the spacing of mounting hooks for cantilevers supporting panels in 4 types of layered wall structures, thus the distances between the created planes of layers of panels can be freely adjusted within these structures. Within the structures of the front of the panels, starting from the layer of panels placed closest to the ground up to the top one, the panels are in one plane, while surfaces of the horizontal cross-sections of the panels do not coincide with each other in a top view, but pass each other.

Each panel consists of the base and bands, keeping the moist substrate with plants inside the panel. The height of the bands is normally ¼ of the panel depth when the panels are mounted on three levels on the module frame and up to ⅓ of the panel depth when using a double or single panel on the module frame. The bottom and bands of the panel are lined with an insulating layer of polystyrene and insulating foil in particular, which are covered with a layer of expanded clay and the substrate with plants. The bands are placed in the guide bar bolted to the edge of the panel, encircling each whole panel around except for parts of both its sides along the panel width, and "truncated" on the sides at a 90 degrees angle to the plane of the module frame, by which they butt the adjacent panels on both sides at more than ⅓ of the depth of each panel. In this way, they form a horizontal layer, stretching along the layered wall structure. The half panels are joined sideways on one side at ⅓ of the panel depth and on the other side for the whole panel depth. Each panel, joining the adjacent panels, creates a long level, stretching along the whole layered wall structure.

The layer of the substrate is thick in the range of 15 to 35 cm.

The silos joining the layers are fully filled on three sides, while their front is covered with a fine weave mesh. The silos have an inclination angle of 30 to 90 degrees as seen in a side view of the structure, and panels with a hole for the silo together with the silo located there are placed every third whole panel without a hole, within a given layer made of panels. The silos have holes for combs made of rods which are put from three sides at fixed distances at the height of the silo.

The irrigation system is installed in all the module panels forming together layers and the panel-modular system. On each layer there is a separate controller that doses the amount of water due to the requirements of the plants placed there. The irrigation system is connected to a continuous water supply or to a replenished tank with a pump which guarantees a continuous water supply to the irrigation system. The water supply varies depending on the season of the year, needs and type of plants, e.g. shade-loving or photophilic plants, spatial and climatic location of the structure. Rainwater is obtained by means of an appropriate scale of panel planes and configuration of layers, and through vertical silos it is distributed within the joint system of the layer wall, which, in the case of regular rainfall, may result in periodic shutdown of the irrigation system.

On the layered wall created with the help of the system according to the invention, plants are placed according to the principle of bipolarity. On the outer and better illuminated parts of the panel, photophilic plants are placed, and on the inner and lower layers of the structure, shade-loving plants.

A characteristic feature of the spherical layered wall structure is a much greater exposure of the whole panel surfaces to light and rainwater because the panel fronts, depending on the plane of the arch, are distancing from each other and do not remain in one plane as in the flat vertical, cylindrical or flat sloping layered wall.

Example V

The panel-modular system of the layered wall for shaping spatial structures according to the invention contains modules, each of which is a combination of a layered, horizontal arrangement of panels, placed no more than three on a frame made of a closed profile with a rectangular cross-section, together with placed on them vegetating plants on the substrate layer. The frames of the modules are joined together in such a way that they form the flat vertical, flat sloping, arched-barrel, spherical, cylindrical and sloping cylindrical load-bearing frame together with applied vertical silos filled with the substrate, joining individual panels and horizontal layers, creating layered "green" wall structures with a horizontal arrangement of layers in six variants as self-supporting structures.

The panels are selected in such a way that the system elements consist of 2 whole panels, 4 half panels. In addition, the system consists of cooperating with panels, panel joining strips, panel docking strips, cantilevers with a fixed deflection angle or variable deflection angle within the structure in the range of 10 to 90 degrees, the lock of panel cantilevers, two types of module frames, flat and bent in the middle part in the range of 0 to 25 degrees in the shape of a rhombus and rectangle and frames resulting from the division, frame couplers, silos with an inclination angle from 30 to 90 degrees, as well as preferably panel bands.

The panels, which are not enclosed by bands, appear exclusively as devoid of plants, with a full or transparent filling, and they are therefore mounted on the module frame in a closer sequence of distances between the panel planes. In addition, as a separate arrangement the system according to the invention comprises the irrigation system for plants, and the substrate for plants and the method of planting them are selected within the structure according to a bipolar key.

The frames of modules are joined by means of couplers, made in particular of thick, profiled metal sheet, bent into a "u" shape with two welded threaded pins located in the inner part of the clamp. Holes in which threaded pins of the clamp joining both frames enter are placed on the perimeter of the whole frame at regular intervals. On the opposite side of the hole into which the pin enters there is a mounting hole for a socket wrench and a self-locking nut which is bolted onto the pin. The mounting hole is located on the outer side of the structure where cantilevers and panels are mounted on the frames. The frames forming cylindrical (vertical and sloping) structures are joined by means of couplers bent in the middle at an angle in the range of 0 to 25 degrees according to the applied deflection of the frames of trapeziums or rhombuses FIG. 35B.

The cylindrical load-bearing plane on which the panels of the system are mounted according to the invention is formed by the flat or bent vertically module frames in the shape of a rhombus or halves and quarters of a rhombus, which are joined sideways diagonally or in the shape of a rectangle and the frames constituting a half of its shape, which are joined sideways by means of couplers, and on which the panels are mounted filled with the substrate with plants, joined by vertical silos, and/or the panels with a transparent or 100% opaque filling, which are combined together in layers by means of cantilevers with a supporting angle of 90 degrees, which as a whole are mounted vertically to the ground and form the cylindrical structure of the layered wall.

On the elements of the vertical trellises of rectangular frames and frames in the shapes resulting from their division by ½, ¼, ⅛ there are mounting holes for cantilevers, at regular intervals from the top to the bottom of the frame, which correspond to the spacing of mounting hooks for cantilevers supporting panels in 6 types of layered wall structures, thus the distances between the created planes of layers of panels can be freely adjusted within these structures.

Within the structures of the front of the panels, in the case of a flat plane, starting from the layer of panels placed closest to the ground up to the top one, the panels are in one plane, while surfaces of the horizontal cross-sections of the panels do not coincide with each other in a top view, but pass each other.

Each panel consists of the base and bands, keeping the moist substrate with plants inside the panel. The height of the bands is normally ¼ of the panel depth when the panels are mounted on three levels on the module frame and up to ⅓ of the panel depth when using a double or single panel on the module frame. The bottom and bands of the panel are lined with an insulating layer of polystyrene and insulating foil in particular, which are covered with a layer of expanded clay and the substrate with plants. The bands are placed in the guide bar bolted to the edge of the panel, encircling each whole panel around except for parts of both its sides along the panel width, and "truncated" on the sides at a 90 degrees angle to the plane of the module frame, by which they butt the adjacent panels on both sides at more than ⅓ of the depth of each panel. In this way, they form a horizontal layer, stretching along the layered wall structure. The half panels are joined sideways on one side at ⅓ of the panel depth and on the other side for the whole panel depth. Each panel, joining the adjacent panels, creates a long level, stretching along the whole layered wall structure.

The layer of the substrate is thick in the range of 15 to 35 cm.

The silos joining the layers are fully filled on three sides, while their front is covered with a fine weave mesh. The silos have an inclination angle of 30 to 90 degrees as seen in a side view of the structure, and panels with a hole for the silo together with the silo located there are placed every third whole panel without a hole, within a given layer made of panels. The silos have holes for combs made of rods which are put from three sides at fixed distances at the height of the silo.

The irrigation system is installed in all the module panels forming together layers and the panel-modular system. On each layer there is a separate controller that doses the amount of water due to the requirements of the plants placed there. The irrigation system is connected to a continuous water supply or to a replenished tank with a pump which guarantees a continuous water supply to the irrigation system. The water supply varies depending on the season of the year, needs and type of plants, e.g. shade-loving or photophilic plants, spatial and climatic location of the structure. Rainwater is obtained by means of an appropriate scale of panel planes and configuration of layers, and through vertical silos it is distributed within the joint system of the layer wall, which, in the case of regular rainfall, may result in periodic shutdown of the irrigation system.

On the layered wall created with the help of the system according to the invention, plants are placed according to the principle of bipolarity. On the outer and better illuminated parts of the panel, photophilic plants are placed, and on the inner and lower layers of the structure, shade-loving plants.

Example VI

The panel-modular system of the layered wall for shaping spatial structures according to the invention contains modules, each of which is a combination of a layered, horizontal arrangement of panels, placed no more than three on a frame made of a closed profile with a rectangular cross-section, together with placed on them vegetating plants on the substrate layer. The frames of the modules are joined together in such a way that they form the flat vertical, flat sloping, arched-barrel, spherical, cylindrical and sloping cylindrical load-bearing frame together with applied vertical silos filled with the substrate, joining individual panels and horizontal layers, creating layered "green" wall structures with a horizontal arrangement of layers in six variants as self-supporting structures.

The panels are selected in such a way that the system elements consist of 2 whole panels, 4 half panels. In addition, the system consists of cooperating with panels, panel joining strips, panel docking strips, cantilevers with a fixed deflection angle or variable deflection angle within the structure in the range of 10 to 90 degrees, the lock of panel cantilevers, two types of module frames, flat and bent in the middle part in the range of 0 to 25 degrees in the shape of a rhombus and rectangle and frames resulting from the division, frame couplers, silos with an inclination angle from 30 to 90 degrees, as well as preferably panel bands.

The panels, which are not enclosed by bands, appear exclusively as devoid of plants, with a full or transparent filling, and they are therefore mounted on the module frame in a closer sequence of distances between the panel planes.

Each panel consists of the base and bands, keeping the moist substrate with plants inside the panel. The height of the bands is normally ¼ of the panel depth when the panels are mounted on three levels on the module frame and up to ⅓ of the panel depth when using a double or single panel on the module frame. The bottom and bands of the panel are lined with an insulating layer of polystyrene and insulating foil in particular, which are covered with the layer of expanded clay and substrate with plants. The bands, placed in the guide bar screwed to the edge of the panel, encircle each whole panel around, except for parts of its both sides along the panel width, and "truncated" on the sides at an angle of 90 degrees to the plane of the module frame, by which they butt the adjacent panels on both sides at more than ⅓ of the depth of each panel. In this way, they form a horizontal layer, stretching along the layered wall structure. The half panels are joined sideways on one side at ⅓ of the panel depth and on the other side along the entire panel depth. Each panel, by connecting to the adjacent panels, creates a long level, stretching along the entire layered wall structure.

In addition, as a separate arrangement the system according to the invention comprises the irrigation system for plants, and the substrate for plants and the method of planting them are selected within the structure according to a bipolar key.

The sloping cylindrical load-bearing plane on which the panels of the system are mounted according to the invention is formed by the flat module frames in the shape of a rectangle and a trapezium which are joined sideways by means of couplers, on which spatial plane are mounted the panels filled with the substrate with plants, joined by vertical silos, and/or with the panels with a transparent or 100% opaque filling, which are combined together in layers by means of cantilevers with a supporting angle in the range of 10 to 90 degrees, which as a whole is mounted diagonally to the ground and form the sloping cylindrical structure of the layered wall.

On the elements of the vertical trellises of rectangular frames and frames in the shapes resulting from their division by ½, ¼, ⅛ there are mounting holes for cantilevers, at regular intervals from the top to the bottom of the frame, which correspond to the spacing of mounting hooks for cantilevers supporting panels in 4 types of layered wall structures, thus the distances between the created planes of layers of panels can be freely adjusted within these structures. A set of frames used in the sloping cylindrical structure has a variable angle Beta for the structure with a given inclination angle with a minimum of 5 frames per quarter of a circle or ellipse which is the base of the cylinder.

The frames of modules are joined by means of couplers, made in particular of thick, profiled metal sheet, bent into a "u" shape with two welded threaded pins located in the inner part of the clamp. Holes in which threaded pins of the clamp joining both frames enter are placed on the perimeter of the whole frame at regular intervals. On the opposite side of the hole into which the pin enters there is a mounting hole for a socket wrench and a self-locking nut which is bolted onto the pin. The mounting hole is located on the outer side of the structure where cantilevers and panels are mounted on the frames. The frames forming spherical or cylindrical (vertical and sloping) structures are joined by means of couplers bent in the middle at an angle in the range of 0 to 25 degrees according to the applied deflection of the frames of trapeziums or rhombuses FIG. 35B.

Each panel consists of the base and bands, keeping the moist substrate with plants inside the panel. The height of the bands is normally ¼ of the panel depth when the panels are mounted on three levels on the module frame and up to ⅓ of the panel depth when using a double or single panel on the module frame. The bottom and bands of the panel are lined with an insulating layer of polystyrene and insulating foil in particular, which are covered with a layer of expanded clay and the substrate with plants. The bands are placed in the guide bar bolted to the edge of the panel, encircling each whole panel around except for parts of both its sides along the panel width, and "truncated" on the sides at a 90 degrees angle to the plane of the module frame, by which they butt the adjacent panels on both sides at more than ⅓ of the depth of each panel. In this way, they form a horizontal layer, stretching along the layered wall structure. The half panels are joined sideways on one side at ⅓ of the panel depth and on the other side for the whole panel depth. Each panel, joining the adjacent panels, creates a long level, stretching along the whole layered wall structure.

Within the structures of the front of the panels, starting from the layer of panels placed closest to the ground up to the top one, the panels are in one plane, while surfaces of the horizontal cross-sections of the panels do not coincide with each other in a top view, but pass each other.

A characteristic feature of the sloping cylindrical layered wall structure is a much greater exposure of the whole panel surfaces to light and rainwater because the panel fronts, depending on the plane of the arch, are distancing from each other and do not remain in one plane as in the flat vertical, cylindrical layered wall.

The joining gap between whole, half or complementary panels is filled with a joining strip equipped with expansion joints located on both sides of the strip and is placed by pressing between the edges of the panels. The layer of the substrate is thick in the range of 15 to 35 cm.

The silos joining the layers are fully filled on three sides, while their front is covered with a fine weave mesh. The silos have an inclination angle of 30 to 90 degrees as seen in a side view of the structure, and panels with a hole for the silo together with the silo located there are placed every third whole panel without a hole, within a given layer made of panels. The silos have holes for combs made of rods which are put from three sides at fixed distances at the height of the silo.

The irrigation system is installed in all the module panels forming together layers and the panel-modular system. On each layer there is a separate controller that doses the amount of water due to the requirements of the plants placed there. The irrigation system is connected to a continuous water supply or to a replenished tank with a pump which guarantees a continuous water supply to the irrigation system. The water supply varies depending on the season of the year, needs and type of plants, e.g. shade-loving or photophilic plants, spatial and climatic location of the structure. Rainwater is obtained by means of an appropriate scale of panel planes and configuration of layers, and through vertical silos it is distributed within the joint system of the layer wall, which, in the case of regular rainfall, may result in periodic shutdown of the irrigation system.

On the layered wall created with the help of the system according to the invention, plants are placed according to the principle of bipolarity. On the outer and better illuminated parts of the panel, photophilic plants are placed, and on the inner and lower layers of the structure, shade-loving plants.

The invention claimed is:

1. A panel-modular layered wall system for self-supporting spatial structures, the panel-modular system comprising: at least two module frames joined together along a perimeter by means of couplers to form a load-bearing frame of the panel-modular system such that at least a portion of the load-bearing frame is tilted from a vertical axis of the panel-modular system;

wherein the at least two module frames are of shapes selected from any or a combination of a rhombus, a rectangle, a trapezium, and shapes resulting from division of the rhombus, the rectangle, and the trapezium by ½, ¼, ⅛, wherein an alpha angle of the at least two module frames is in the range of 25 to 90 degrees, and wherein the at least two module frames are flat or bent symmetrically about a central part at an angle in a range of 0 to 25 degrees;

a plurality of panels of different shapes coupled to the frame such that the panels are arranged as non-fully overlapping horizontal layers of different shapes, wherein the panels are filled with a substrate with plants, wherein the panels are of shapes selected from a whole triangle, a half triangle, a quarter triangle, a semi-circle, and a quarter of a circle, wherein each panel of the plurality of panels consists of a base and bands, the bands surrounding the panel such that the panel is able to hold the substrate with the plants;

wherein the panels are coupled to the at least two module frames through a plurality of cantilevers, wherein the cantilevers are configured to hold the corresponding panels in a horizontal orientation, wherein the cantilevers include guide bars configured to engage with docking strips provided on an underside of the panels by means of a lock, a bolt, or a plug, for mounting of the panels;

wherein the at least two module frames are joined by means of "u" shaped couplers with welded two threaded pins located in an inner part of a clamp, which join edges of the at least two module frames through mounting holes on the at least two module frames, the mounting holes being located on the perimeter of the at least two module frames at regular intervals;

wherein the at least two module frames are connected in such a way that they form any or a combination of a flat vertical load-bearing frame, a flat sloping load-bearing frame, a spatial arched-barrel load-bearing frame, a spatial spherical load-bearing frame, a spatial cylindrical load-bearing frame, and a spatial sloping cylindrical load-bearing frame;

wherein a joining gap between the panels is filled with a joining strip, wherein the joining strip is provided with drains, wherein trellises of the at least two module frames include mounting holes for the cantilevers, the mounting holes being located at regular distances from top to bottom of the trellises of the at least two module frames, wherein the cantilevers include mounting hooks at corresponding spacing for coupling of the cantilevers to the trellises of the at least two module frames;

wherein the panel-modular system further includes a plurality of silos filled with the substrate and located between adjacent horizontal layers of the panels, wherein the silos are fitted through holes of corresponding shape in the base of the panels such that lower edges of the silos reach below the bands of the panels on a lower horizontal layer of the adjacent horizontal layers, in such a way that the silos filled with the substrate rests against the lower horizontal layer of the adjacent horizontal layers, and wherein the silos joining the panels have an inclination angle between 30 and 90 degrees to the vertical axis of the panel-modular system; and wherein a width of the panels is identical to a width of a corresponding frame of the at least two module frames, wherein the panels are placed symmetrically above, below, or next to each other at an equal distance, the distance being a percent value of a height of the at least two module frames measured from the base of the panels.

2. The panel-modular system according to claim 1, wherein the plurality of panels includes two whole panels and four half panels, and wherein the two whole panels are joined along both sides at a 90 degree angle to a plane of the at least two module frames.

3. The panel-modular system according to claim 2, wherein the four half panels are in the shape of the quarter of the circle or an isosceles triangle, and wherein at least two of the four half panels are rigidly combined into another whole panel by means of a mounting batten.

4. The panel-modular system according to claim 1, wherein the panels filled with the substrate with the plants and panels with a transparent or opaque filling are diagonally mounted to a ground surface and form a sloping structure of a layered wall, wherein up to two panels of the panels filled with the substrate with the plants are placed, one above the other, on the at least two module frames.

* * * * *